(12) United States Patent
Moore et al.

(10) Patent No.: US 11,663,204 B1
(45) Date of Patent: May 30, 2023

(54) DATA AGGREGATION AND PROCESS AUTOMATION SYSTEMS AND METHODS

(71) Applicant: Myndshft Technologies, Inc., Dover, DE (US)

(72) Inventors: John K. Moore, Phoenix, AZ (US); Brian J. Downs, Scottsdale, AZ (US); Candy Jimenez, Tempe, AZ (US); Tyler Wince, Mesa, AZ (US)

(73) Assignee: Myndshft Technologies, Inc, Mesa, AZ (US)

( * ) Notice: Subject to any disclaimer, the term of this patent is extended or adjusted under 35 U.S.C. 154(b) by 334 days.

(21) Appl. No.: 16/998,819

(22) Filed: Aug. 20, 2020

Related U.S. Application Data

(60) Provisional application No. 62/890,359, filed on Aug. 22, 2019.

(51) Int. Cl.
| | |
|---|---|
| G06F 7/00 | (2006.01) |
| G06F 16/242 | (2019.01) |
| G06F 16/2455 | (2019.01) |
| G06F 16/21 | (2019.01) |
| G06F 16/25 | (2019.01) |
| G06F 21/62 | (2013.01) |
| G06Q 20/06 | (2012.01) |
| G06N 5/025 | (2023.01) |
| G06N 20/00 | (2019.01) |
| H04L 9/06 | (2006.01) |
| H04L 9/00 | (2022.01) |

(52) U.S. Cl.
CPC .......... *G06F 16/244* (2019.01); *G06F 16/211* (2019.01); *G06F 16/24564* (2019.01); *G06F 16/254* (2019.01); *G06F 21/6245* (2013.01); *G06N 5/025* (2013.01); *G06N 20/00* (2019.01); *G06Q 20/0658* (2013.01); *H04L 9/0637* (2013.01); *H04L 9/50* (2022.05); *H04L 2209/56* (2013.01)

(58) Field of Classification Search
CPC ................. G06F 16/244; G06F 16/211; G06F 16/24564; G06F 16/254; G06F 21/6245; G06N 20/00; G06N 5/025; G06Q 20/0658; H04L 9/0637; H04L 9/50; H04L 2209/56
USPC ................................................. 707/600–899
See application file for complete search history.

(56) References Cited

U.S. PATENT DOCUMENTS 9,705,835 B2 * 7/2017 Burge ..................... H04L 51/52

* cited by examiner

*Primary Examiner* — Isaac M Woo
(74) *Attorney, Agent, or Firm* — Booth Udall Fuller, PLC

(57) ABSTRACT

A system and method for data aggregation and process automation is disclosed. The method includes receiving a first data object from a first integration point through a first smart adapter, identifying an appropriate rules library from a plurality of rules libraries using a rules engine, the appropriate rules library being identified using the first data object, and applying the appropriate rules library through the rules engine. The rules are applied by instructing a transformation module to transform the first data object into a transformed data object, instructing a validation module to validate at least one of the first data object and the transformed data object, and instructing an aggregation module to perform a statistical analysis on one of the first data object and the transformed data object. Finally, the method includes sending the transformed data object to a second integration point associated with a second smart adapter.

20 Claims, 10 Drawing Sheets

DATA AGGREGATION AND PROCESS AUTOMATION SYSTEMS AND METHODS

RELATED APPLICATIONS

This application claims the benefit of U.S. provisional patent application 62/890,359, filed Aug. 22, 2019 titled "Data Aggregation and Process Automation Systems and Methods," the entirety of the disclosure of which is hereby incorporated by this reference.

TECHNICAL FIELD

Aspects of this document relate generally to data aggregation and process automation.

BACKGROUND

Many industries are built upon multiple organizations belonging to "sub industries" that must all work together, despite sometimes having divergent business interests and often using incompatible infrastructure and systems. Often, these organizations utilize legacy systems that have been built up over a period of many years, at great cost. Because of this, adoption of new systems and integration with other legacy systems is limited, stunting growth and inhibiting innovation and cooperation in general within the industry.

For example, a healthcare provider such as a hospital frequently interacts with payers such as insurance companies, as well as other providers such as pharmacies and laboratories. Each of these organizations has internal systems for executing their portion of the healthcare revenue cycle that have been tailored to their particular area of operation. Because of divergent business interests, as well as divergent architectures and protocols, these systems are rarely exposed to other players in the healthcare industry, to the detriment of all. Even with the use of trust-agnostic networks such as permissioned blockchain, the legacy systems and procedures of each organization must be translated and consolidated quickly, or any benefits from the trust-agnostic network will be lost to inefficiencies in interfacing with the network.

SUMMARY

According to an aspect, a method for data aggregation and process automation may comprise receiving a first data object from a first integration point, which is a healthcare provider system, through a first smart adapter configured to send and receive data objects to and from the first integration point, the first smart adapter comprising a first schema describing a first data object format utilized by the first integration point and a first protocol for communicating with the first integration point. An appropriate rules library may be identified from a plurality of rules libraries using a rules engine, the appropriate rules library being identified using the first data object. Each rule library comprise at least one rule, and the appropriate rules library may indicate a second smart adapter configured to send and receive data objects to and from a second integration point, the second smart adapter comprising a second schema describing a second data object format utilized by the second integration point and a second protocol for communicating with the second integration point. The appropriate rules library may be applied through the rules engine by instructing a transformation module with the rules engine to transform the first data object having the first data object format into a transformed data object having the second data object format, the transformation module performing the transformation using the first schema and the second schema. The appropriate rules library may be applied through the rules engine by instructing a validation module with the rules engine to validate at least one of the first data object and the transformed data object by at least one of: comparing the at least one of the first data object and the transformed data object with a different source of data, and determining if the at least one of the first data object and the transformed data object is internally consistent. The appropriate rules library may be applied through the rules engine by instructing an aggregation module with the rules engine to perform a statistical analysis on one of the first data object and the transformed data object to generate statistical data, and to create a copy of the first data object. The appropriate rules library may be applied through the rules engine by attempting to generate, with the rules engine, a response data object on behalf of the second integration point by applying at least one rule of the appropriate rules library defined to address the request for prior authorization using the first data object, the response data object being in the first data object format and comprising a determination of prior authorization from the rules engine. The transformed data object may be sent to the second integration point associated with the second smart adapter, if the rules engine was unable to generate the response data object. A second data object comprising a determination of prior authorization from the second integration point may be received. The second integration point may be a healthcare payer system. The second data object may be identified as a response to the first data object received from the first integration point. Another appropriate rules library may be identified from the plurality of rules libraries using the rules engine, the another appropriate rules library being identified using at least one of the second data object, an origin of the first data object, and the response data object. The another appropriate rules library may be applied through the rules engine by instructing the transformation module with the rules engine to transform the second data object having the second data object format into the response data object having the first data object format, the transformation module performing the transformation using the second schema and the first schema. The another appropriate rules library may be applied through the rules engine by instructing the validation module with the rules engine to validate at least one of the second data object and the response data object by at least one of: comparing the at least one of the second data object and the response data object with the different source of data, and determining if the at least one of the second data object and the response data object is internally consistent. The another appropriate rules library may be applied through the rules engine by instructing the aggregation module with the rules engine to: perform the statistical analysis on one of the second data object and the response data object to generate statistical data, and create a machine learning model using at least the copy of the first data object and the response data object. The another appropriate rules library may be applied through the rules engine by instructing a cleansing module to sanitize the copy of the first data object, placing the copy of the first data object in compliance with a data privacy policy before creating the machine learning model. The another appropriate rules library may be applied through the rules engine by creating at least one of a modified rule and a new rule within the appropriate rules library, using the machine learning model and the rules engine. The response data object may be sent to the first integration point.

Aspects of the method for data aggregation and process automation may further include, wherein one of the first smart adapter and the second smart adapter comprises a blockchain smart adapter configured to communicate with an organization within a permissioned blockchain network through a peer node. The rules engine may instruct the transformation module and validation module through a permissioned blockchain network, and wherein the at least one rule of each rules library of the plurality of rules libraries is evaluated at runtime rather than precompiled. The different source of data used by the validation module for comparison may be an immutable transaction ledger of the permissioned blockchain network.

In another aspect, a method for data aggregation and process automation may comprise receiving a first data object from a first integration point through a first smart adapter configured to send and receive data objects to and from the first integration point, the first smart adapter comprising a first schema describing a first data object format utilized by the first integration point and a first protocol for communicating with the first integration point. An appropriate rules library may be identified from a plurality of rules libraries using a rules engine, the appropriate rules library being identified using the first data object. Each rule library may comprise at least one rule. The appropriate rules library may indicate a second smart adapter configured to send and receive data objects to and from a second integration point, the second smart adapter comprising a second schema describing a second data object format utilized by the second integration point and a second protocol for communicating with the second integration point. The appropriate rules library may be applied through the rules engine by instructing a transformation module with the rules engine to transform the first data object having the first data object format into a transformed data object having the second data object format, the transformation module performing the transformation using the first schema and the second schema. The appropriate rules library may be applied through the rules engine by instructing a validation module with the rules engine to validate at least one of the first data object and the transformed data object by at least one of: comparing the at least one of the first data object and the transformed data object with a different source of data, and determining if the at least one of the first data object and the transformed data object is internally consistent. The appropriate rules library may be applied through the rules engine by instructing an aggregation module with the rules engine to perform a statistical analysis on one of the first data object and the transformed data object to generate statistical data. The transformed data object may be sent to the second integration point associated with the second smart adapter.

Aspects of the method for data aggregation and process automation may further comprise receiving a second data object comprising a determination of prior authorization from the second integration point, wherein the second integration point is a healthcare payer system. The second data object may be identified as a response to the first data object received from the first integration point, wherein the first integration point is a healthcare provider system, and wherein the first data object comprises a request for prior authorization, patient information, insurance policy information, and treatment information. Another appropriate rules library may be identified from the plurality of rules libraries using the rules engine, the another appropriate rules library being identified using at least one of the second data object and an origin of the first data object. The another appropriate rules library may be applied through the rules engine by instructing the transformation module with the rules engine to transform the second data object having the second data object format into a response data object having the first data object format, the transformation module performing the transformation using the second schema and the first schema. The another appropriate rules library may be applied through the rules engine by instructing the validation module with the rules engine to validate at least one of the second data object and the response data object by at least one of: comparing the at least one of the second data object and the response data object with the different source of data, and determining if the at least one of the second data object and the response data object is internally consistent. The another appropriate rules library may be applied through the rules engine by instructing the aggregation module with the rules engine to perform the statistical analysis on one of the second data object and the response data object to generate statistical data. The response data object may be sent to the first integration point.

Aspects of the method for data aggregation and process automation may further comprise, wherein the rules engine communicates with the transformation module and validation module through one of a permissioned blockchain network and a network interface communicatively coupling the rules engine and the transformation module through a network, and wherein the at least one rule of each rules library of the plurality of rules libraries is evaluated at runtime rather than precompiled. The first data object may comprise an inquiry to be answered by the second integration point. Applying the appropriate rules library through the rules engine may further comprises: attempting to generate a response data object on behalf of the second integration point by applying at least one rule of the appropriate rules library defined to address the inquiry, the response data object being in the first data object format, sending the response data object to the first integration point via the first smart adapter upon successful generation of the response data object, and continuing to apply the appropriate rules library. One of the first smart adapter and the second smart adapter may comprise a blockchain smart adapter configured to communicate with an organization within a permissioned blockchain network through a peer node. The different source of data may be used by the validation module for comparison is an immutable transaction ledger of the permissioned blockchain network. Instructing the aggregation module with the rules engine may further comprise creating a copy of the first data object using the aggregation module, and creating a machine learning model using the copy of the first data object. Applying the appropriate rules library may further comprise instructing a cleansing module to sanitize the copy of the first data object, placing the copy of the first data object in compliance with a data privacy policy before creating the machine learning model, and creating at least one of a modified rule and a new rule within the appropriate rules library, using the machine learning model and the rules engine.

In yet another aspect, a data aggregation and process automation system may comprise a processor communicatively coupled to a memory and a network interface, the network interface communicatively coupled to a network. A storage may be communicatively coupled to the processor, the storage comprising a first smart adapter associated with a first integration point and configured to send and receive data objects to and from the first integration point using the network interface, and a second smart adapter associated with a second integration point and configured to send and receive data objects to and from the second integration point using the network interface, the first smart adapter comprising a first schema describing a first data object format utilized by the first integration point and a first protocol for communicating with the first integration point, the second smart adapter comprising a second schema describing a second data object format utilized by the second integration point and a second protocol for communicating with the second integration point. The storage may comprise a transformation module configured to transform an incoming data object organized in the first data object format into a transformed data object having the second data object format, the transformation module performing the transformation using the first schema and the second schema. The storage may comprise an aggregation module configured to gather statistical data from an observed data object by performing a statistical analysis on the observed data object. The storage may comprise a validation module configured to validate an unvalidated data object by at least one of comparing the unvalidated data object with a different source of data, and determining if the unvalidated data object is internally consistent. A rules engine may be configured to identify an appropriate rules library from a plurality of rules libraries using a first data object received through the first smart adapter from the first integration point, each rule library having at least one rule, wherein the appropriate rules library indicates the second smart adapter. The rules engine may also be configured to apply the appropriate rules library through at least one of: instructing the transformation module to transform the first data object having the first data object format into the transformed data object, instructing the validation module to validate the first data object, instructing the aggregation module to gather statistical data from one of the first data object and the transformed data object, and sending the transformed data object to the second integration point associated with the second smart adapter.

Aspects of the data aggregation and process automation system may further comprise the rules engine communicating with the transformation module and validation module through one of a permissioned blockchain network and the network interface. The first data object may comprise an inquiry to be answered by the second integration point. The rules engine may be further configured to attempt to generate a response data object on behalf of the second integration point by applying at least one rule of the appropriate rules library defined to address the inquiry, the response data object being in the first data object format. The rules engine may be further configured to send the response data object to the first integration point via the first smart adapter upon successful generation of the response data object. The rules engine may be further configured to continue to apply the appropriate rules library if the generation of the response data object is unsuccessful. One of the first smart adapter and the second smart adapter may comprise a blockchain smart adapter configured to communicate with an organization within a permissioned blockchain network through a peer node. The validation module may be further configured to validate the unvalidated data object by comparing the unvalidated data object to an immutable transaction ledger of the permissioned blockchain network. The aggregation module may be further configured to create a copy of the observed data object, and create a machine learning model using the copy of the observed data object. A cleansing module may be configured to sanitize the copy of the observed data object to place the copy of the observed data object in compliance with a data privacy policy before creating the machine learning model. The rules engine may be further configured to use the machine learning model to create at least one of a modified rule and a new rule within the appropriate rules library.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112(f). Moreover, even if the provisions of 35 U.S.C. § 112(f) are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The disclosure will hereinafter be described in conjunction with the appended drawings, where like designations denote like elements, and.

DETAILED DESCRIPTION

Figure 1:
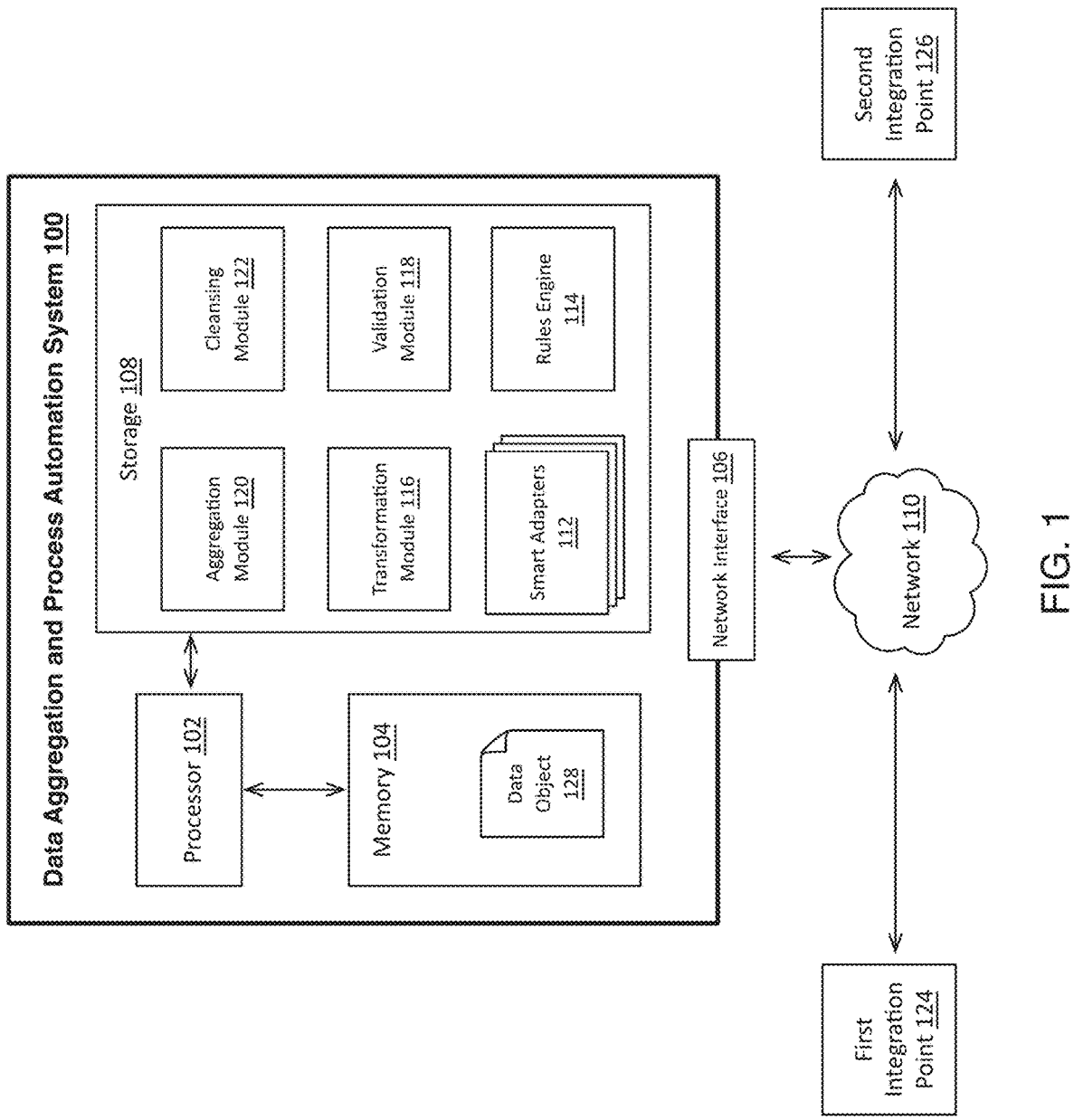
FIG. 1 is a schematic view of a data aggregation and process automation (DAPA) system.

This disclosure, its aspects and implementations, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes a number of embodiments in many different forms, there is shown in the drawings and will herein be described in detail particular embodiments with the understanding that the present disclosure is to be considered as an exemplification of the principles of the disclosed methods and systems, and is not intended to limit the broad aspect of the disclosed concepts to the embodiments illustrated.

Many industries are built upon multiple organizations belonging to "sub industries" that must all work together, despite sometimes having divergent business interests and often using incompatible infrastructure and systems. Often, these organizations utilize legacy systems that have been built up over a period of many years, at great cost. Because of this, adoption of new systems and integration with other legacy systems is limited, stunting growth and inhibiting innovation and cooperation in general within the industry.

For example, a healthcare provider such as a hospital frequently interacts with payers such as insurance companies, as well as other providers such as pharmacies and laboratories. Each of these organizations has internal systems for executing their portion of the healthcare revenue cycle that have been tailored to their particular area of operation. Because of divergent business interests, as well as divergent architectures and protocols, these systems are rarely exposed to other players in the healthcare industry, to the detriment of all. Even with the use of trust-agnostic networks such as permissioned blockchain, the legacy systems and procedures of each organization must be translated and consolidated quickly, or any benefits from the trust-agnostic network will be lost to inefficiencies in interfacing with the network.

Contemplated herein is a data aggregation and process automation system (hereinafter DAPA system), able to provide a "translator" for a multitude of legacy systems, to facilitate their interaction with each other, as well as with new systems, and systems yet to come. The DAPA system may further be used to automate certain processes, automatically determining what information is needed to accomplish a particular task and interfacing with the various systems needed to obtain it, and put it in a functional format. The DAPA system may further be used to extract distilled, analyzed, and even redacted versions of data passing between systems, for various uses.

Unlike conventional systems for integrating systems and automating processes and transactions, the DAPA system is flexible, and able to be rapidly configured and quickly accommodate new systems. In some embodiments, the DAPA system may be reconfigured without any service interruption. All of this is accomplished through the use of one or more smart adapters combined with modules driven by a rules engine. The rules engine itself may be dynamically updated. In some embodiments, those updates may be based upon the results of models generated using observations made of historical operations and transactions.

An advantage provided by the contemplated DAPA system and method is that it may be directly integrated with existing systems, which may reduce or even remove the need for human input of information needed to accomplish a task, make a request, render a decision, and the like. The technology used in most industries has evolved slowly, with adoption of new technologies occurring at different rates. A consequence of this has been that, in most industries, there are entities using cutting edge technology having to interact with other entities still relying on legacy systems that can sometimes be vastly different. One example of this is the transmission of records, which could be done as digital documents shared over the internet, or sent using a fax machine. Often, a human has to bridge these gaps, introducing the potential for input errors that could lead to mistakes or delays in rendering a decision.

As a specific example, some embodiments of the DAPA system can integrate with EHR/EMR record systems in use by healthcare payers (e.g. medical insurance companies, etc.) and healthcare providers (e.g. hospitals, pharmacies, labs, etc.), ingesting patient information directly from these systems without requiring an individual to transcribe it into a web portal or paper form.

The systems and methods contemplated herein will be discussed in the context of a variety of use cases. However, it should be understood that the use cases presented herein are not intended to be limiting. The contemplated system may be applied to any industry or endeavor which involves interacting with another entity, and which would benefit from the ability to interact with other systems without either system having to conform to a particular standard or protocol.

FIG. 1 is a schematic view of a non-limiting example of a DAPA system 100. As shown, the DAPA system 100 comprises a plurality of smart adapters 112, a transformation module 116, an aggregation module 120, a cleansing module 122, and a validation module 118. Some embodiments, including the embodiment shown in FIG. 1, may further comprise a rules engine 114, while other embodiments may interact with a rules engine 114 maintained external to the DAPA system 100. Different embodiments of the DAPA system 100 will be discussed in greater detail with respect to FIG. 2, below.

As shown, the DAPA system 100 comprises a plurality of smart adapters 112. Each smart adapter 112 is configured to interact with an integration point (e.g. first/second integration points 126,128, etc.), using network protocols, procedures, and data structures particular to a specific system or collection of systems associated with an organization. In some embodiments, a smart adapter 112 may be configured to comply with the authentication, encryption, and/or other security procedures for a particular integration point. Smart adapters 112 and integration points will be discussed in greater detail with respect to FIG. 2A, below.

The DAPA system 100 further comprises a transformation module 116, which can manipulate data from one form, format, or structure to another. Every integration point has at least one associated data structure, which may be standard or may be proprietary. As discussed above, the smart adapter 112 for a particular integration point understands the data in which that integration point is "fluent". The transformation module 116 operates to transform the data from one integration point to meet the requirements of another integration point. The transformation module 116 will be discussed in greater detail with respect to FIG. 2B, below.

According to various embodiments, the DAPA system 100 also includes a validation module 118. The validation module 118 is used to validate data objects 128 passing through the DAPA system 100. This helps ensure consistency, catching errors before they create problems further down the line. The validation module 118 will be discussed in greater detail with respect to FIG. 2C, below.

The aggregation module 120 observes the data passing through the DAPA system 100, and is able to analyze the data and, in some embodiments, fork off copies of the data for other uses. The data cleansing module 122 may be used to redact or otherwise de-identify sensitive data to comply with regulations or privacy policies before being sent on for consumption. The aggregation module 120 and cleansing module 112 will be discussed in greater detail with respect to FIG. 2D, below.

As shown, the DAPA system 100 makes use of a rules engine 114. In the context of the present description, a rules engine 114 is a module able to drive the various components within the DAPA system 100, based upon predefined logic and rules. In some embodiments, the rules engine 114 may be specific to the DAPA system 100, while in other embodiments, the rules engine 114 may be external to the DAPA system 100, and may operate with a scope beyond just the DAPA system 100 (e.g. it controls more than just the DAPA system 100, etc.).

When a data object 128 (e.g. file, packet, signal, data structure, stream, etc.) is received at a smart adapter 112, the rules engine 114 determines what needs to be done in response, such as how the data needs to be transformed or where it needs to go to accomplish the task at hand. The rules engine 114, and the rules it implements, will be discussed in greater detail with respect to FIG. 2E, below.

The DAPA system 100 facilitates the transmission and/or processing of data objects 128. In the context of the present description and the claims that follow, a data object is digital information that may be in any form known in the art for storing information, which may itself be a single piece of information, a series, a range, a matrix, a binary file (e.g. an image, a sound, a movie, etc.), or any other type of data known in the art. Every data object 128 may be described as being in some sort of format, or a predictable structure by which the information within the data object is organized. The DAPA system 100 makes it possible for two integration points to interact with each other, even though they each place their data objects 128 in vastly different formats.

The non-limiting example of a DAPA system 100 shown in FIG. 1 comprises a processor 102 communicatively coupled to a memory 104, a storage 108, and a network interface 106. The network interface is communicatively coupled to various integration points, through a network 106 (e.g. LAN, WAN, Internet, virtualized network, blockchain network, etc.).

However, it should be noted that the DAPA system 100 may be implemented in a number of different computing environments. For example, in some embodiments, the DAPA system 100 may operate on a single device, such as specific computing device 600 of FIG. 6. The rules engine 114, transformation module 118, aggregation module 120, cleansing module 122, and smart adapters 112 may be software modules operating on a single device that has a processor 102 and a memory 104 that are preforming other operations as well. In other embodiments, the DAPA system 100, or components of the DAPA system 100, may be modules, subroutines, or components within a larger software system (e.g. part of a gateway to a private network, etc.). In some embodiments, rules engine 114, transformation module 118, aggregation module 120, cleansing module 122, and smart adapters 112 may exist as containers or pods in an abstracted, containerized, or virtualized system implemented on a single device or distributed over a plurality of devices (e.g. localized computing cluster, distributed cloud computing platform, etc.). In still other embodiments, the DAPA system 100 may be implemented as a node, or the components of the DAPA system 100 such as the rules engine 114 or smart adapter 112 may each be instantiated as nodes within a permissioned blockchain network. A blockchain network implementation will be discussed in greater detail with respect to FIG. 4, below.

Figure 2A:
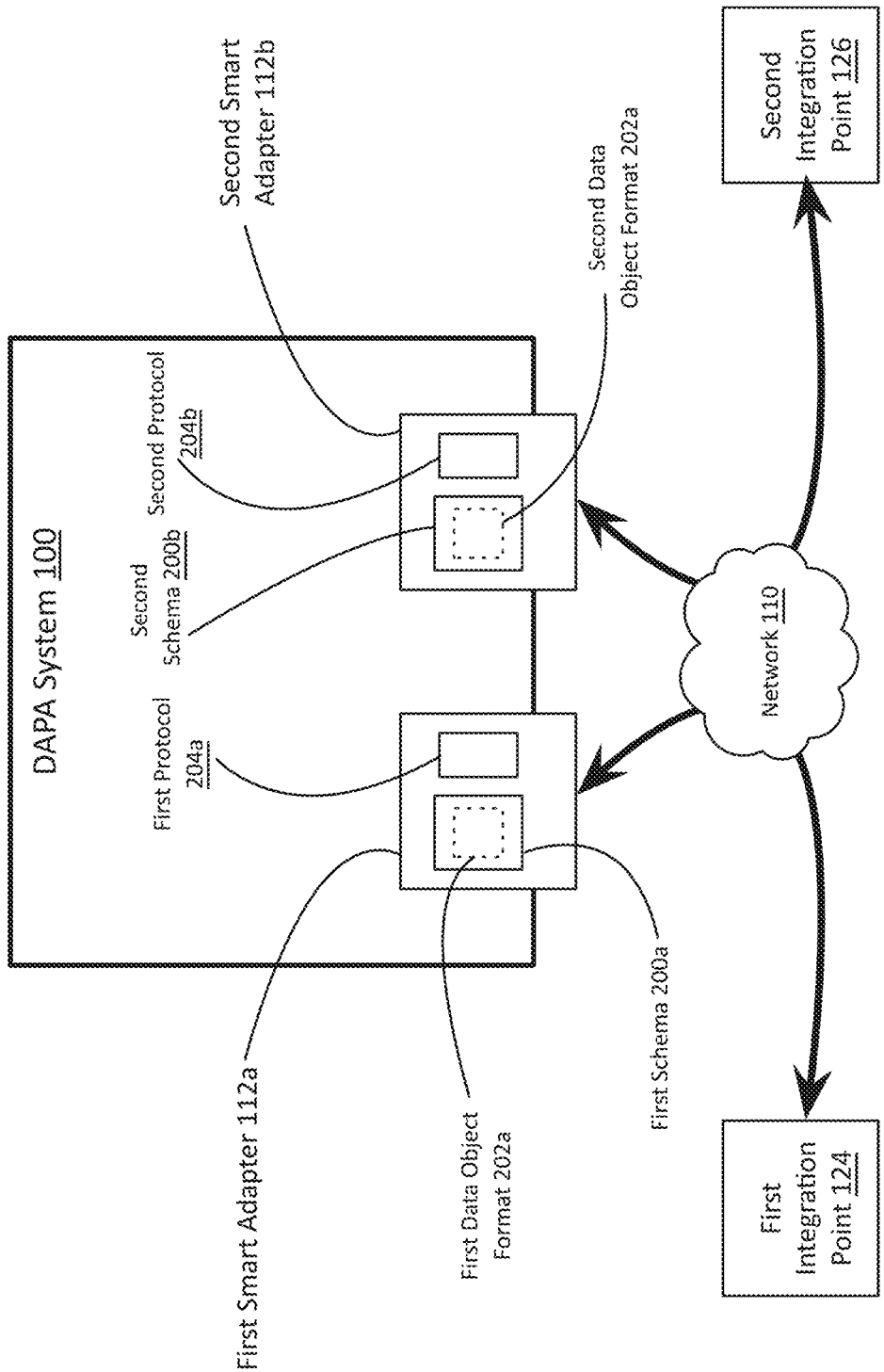
FIG. 2A is a schematic view of two smart adapters within a DAPA system.

FIG. 2A is a schematic view of a non-limiting example of two smart adapters within a DAPA system. As shown, the DAPA system 100 has a first smart adapter 112a and a second smart adapter 112b. According to various embodiments, a DAPA system 100 will have a plurality of smart adapters 112, each giving the DAPA system 100 the ability to send and receive data objects 128 to and from an integration point.

It should be noted that various elements of the DAPA system 100, particularly hardware elements such as the network adapter 110, as well as the other modules, have been omitted from FIG. 2A for clarity. These omissions should not be interpreted as limitations. It should also be noted that FIG. 2A is a functional representation of the operation of the smart adapters 112. For example, the first smart adapter 112a is being shown directly interacting with the first integration point 124 through the network 110. In one embodiment, this interaction occurs through the network interface 106, which is coupled to the Internet. In another embodiment, this interaction could occur entirely within the memory 104 of the DAPA system 100, and the network 110 may be a permissioned blockchain network being hosted on the same hardware. Instead of the smart adapter 112*a* passing a data object 128 through a tangible network interface 106, it could be inserted into the permissioned blockchain network through a peer node. Both of these embodiments, and numerous others, are portrayed by the visual representation of the interaction between the smart adapters 112 and the integration points of FIG. 2A.

As shown, the DAPA system 100 comprises one or more smart adapters 112, each associated with an integration point. In the context of the present description and the claims that follow, a smart adapter is "associated with" an integration point when it is able to communicate with that integration point (e.g. able to receive data objects from that integration point, able to send data objects to that integration point, etc.). In some embodiments, these interactions are two-way, while in other embodiments smart adapters may be defined such that they allow communication only in one direction, either sending or receiving.

According to various embodiments, each smart adapter 112 comprises a schema 200 describing one or more data object formats 202 associated with that integration point. This serves as a "Rosetta Stone," allowing an organization making use of proprietary or legacy systems with unique data structures to interface with the DAPA system 100 without requiring modification of the proprietary/legacy system, or how it communicates. Boilerplate smart adapters 112 may be prepared that can be quickly customized for incorporating the ability to work with a new integration point.

Each smart adapter 112 also comprises a protocol 204, according to various embodiments. The protocol 204 comprises all the information, credentials, cryptographic keys, procedures, addresses, and the like, to comply with the authentication, encryption, and/or other security or access procedures for a particular integration point.

According to various embodiments, each smart adapter 112 is configured to interact with a specific integration point (e.g. first integration point 124, etc.). In some embodiments, a smart adapter 112 could be configured to interact with a type or class of integration point (e.g. multiple machines having identical or near identical properties, etc.). As a specific example, in one embodiment, a smart adapter 112 may be defined to interact with a collection of cloud storage servers, each using the same communications protocol and accepting the same set of authentication credentials, only differing in IP address. Rather than defining multiple smart adapters, a single smart adapter may be defined, with a list of the IP addresses of that set of integration points. In other embodiments, a smart adapter may be defined for each and every integration point. In still other embodiments, a smart adapter may be defined for each protocol used by each integration point.

As shown, the DAPA system 100 stands between a first integration point 124 and a second integration point 126. In the context of the present description, a first integration point 124 is a system that intends to interact with the second integration point 126 in some way. In some cases, the interaction may be one-way (e.g. first integration point 124 is sending data to the second integration point 126, etc.), while in other cases the interaction may be two-way. For example, the first integration point 124 may be requesting information or a decision based upon data it is passing to the second integration point 126. The data is passed to the second integration point 126 by the DAPA system 100 in a form and manner required by the second integration point 126. The response from the second integration point 126 is sent back to the first integration point 124 via the DAPA system 100, which again places it in an appropriate form.

Smart adapters may be configured to interaction with a wide array of integration points, ranging from submitting text through a standard web interface to encrypted communication of proprietary data objects with a one-of-a-kind corporate mainframe. Other exemplary integration point types include, but are not limited to, SaaS platforms and applications, portals, HIS, and the like. Smart adapters 112 may interact via API (e.g. REST, GraphQL, etc.), or any communication protocols (e.g. HTTPS, SFTP, etc.) known in the art.

There are different methods for ensuring that incoming data objects are directed to the correct smart adapters. In some embodiments, different smart adapters 112 may be given their own "channel" to listen to (e.g. a network port, a specific domain top level or otherwise, etc.). In other embodiments, the format of a data object may be unique enough to indicate which smart adapter should handle it. In still other embodiments, multiple smart adapters may be accessible through the same address, yet be differentiated by the credentials used to gain access (e.g. the username given and authenticated indicates which smart adapter 112 should handle the interaction, etc.). In other embodiments, all incoming communications may pass through a gateway that serves as a sorting mechanism, sending each communication to the correct smart adapter.

Figure 2B:
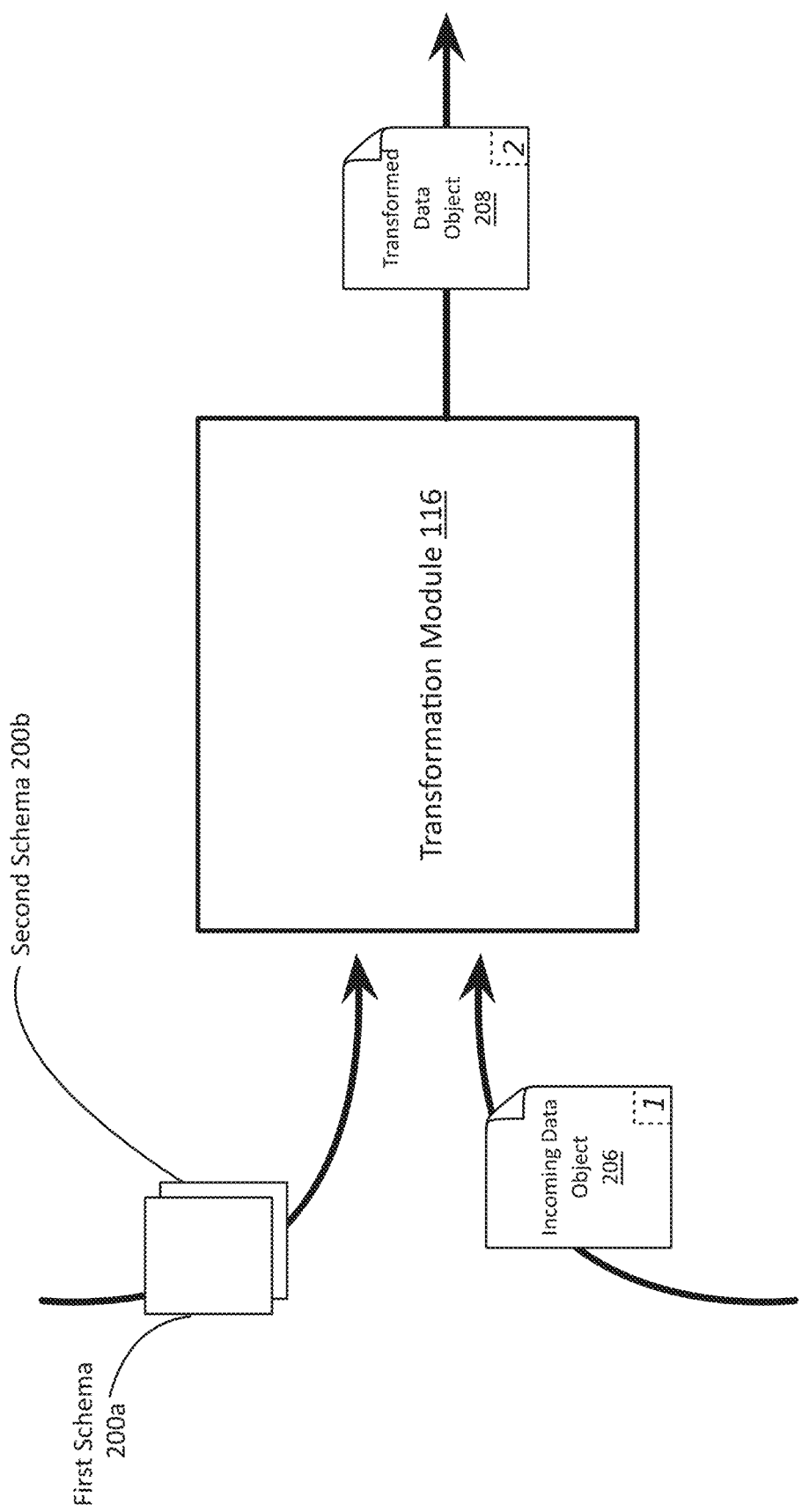
FIG. 2B is a schematic view of a transformation module within a DAPA system.

FIG. 2B is a schematic view of a non-limiting example of a transformation module within a DAPA system. According to various embodiments, the transformation module 116 can manipulate a data object 128 from one form, format, or structure to another. Every integration point has a data structure or format, which may be standard or may be proprietary. As discussed above, the smart adapter 112 for a particular integration point understands the data in which that integration point is "fluent". The transformation module 116 operates to transform the data from one integration point, in preparation for meeting the requirements of another integration point, or simply to be understood and processed within the DAPA system 100.

As a specific example, a patient record received by the DAPA system 100 through the appropriate smart adapter 112 may be in a format unique to the EHR system used by a particular hospital. The transformation module 116 may be used to transform that data into a format that can be passed on, to be processed by a smart contract within a blockchain network. The transformation module 116 may again be used to transform the resulting decision or data object into a format compatible with the hospital's EHR system before being transmitted by the smart adapter 112.

As shown, the incoming data object 206 is transformed into a transformed data object 208 having a format associated with the next actions that will be performed on the data object (e.g. sending to another integration point, statistical analysis by the aggregation module, etc.). In some embodiments, the transformation may be between the incoming smart adapter (e.g. first smart adapter 112*a*) and the outgoing smart adapter 112*b* (e.g. second smart adapter 112*b*). In other embodiments, the transformation module 116 may also take a data object from a first format (described by a first schema), and then place it in an intermediate format, for use within the DAPA system 100 itself. The use of an intermediate data format may be advantageous, as it reduces the necessary complexity of validation and/or aggregation and analysis of data. If every data object has the same format within the DAPA system, those functions are much easier to develop and modify. Using the schema 200 of the smart adapters, a data object 128 may be transformed by the transformation module 116 for any destination.

In some embodiments, the schema 200 may describe the data format in terms of data tags. In the context of the present description and the claims that follow, a data tag is a metadata that describes the nature of a field within a data object, such as a name or a date. In some embodiments, each piece of information included in a data object 128 is accompanied by a tag that indicates what that piece of information is conveying. This facilitates the identification of a data object and which smart adapter is needed to receive it, and also facilitates the transformation of the data object into an intermediary format, as discussed above.

In other embodiments, including the non-limiting example shown in FIG. 2B, the smart adapter 112 that receives the data object is all that is needed to understand the information within the data object. As shown, the schema 200 from the smart adapter(s) representing the two endpoints of the transformation provide the needed information regarding the structure of the data object. In some embodiments, the transformation module 116 performs its transformations on data objects 128 as they reside within volatile memory 104. In other embodiments, the transformation module 116 may perform transformations on data objects 128 stored within a non-volatile storage 108.

Figure 2C:
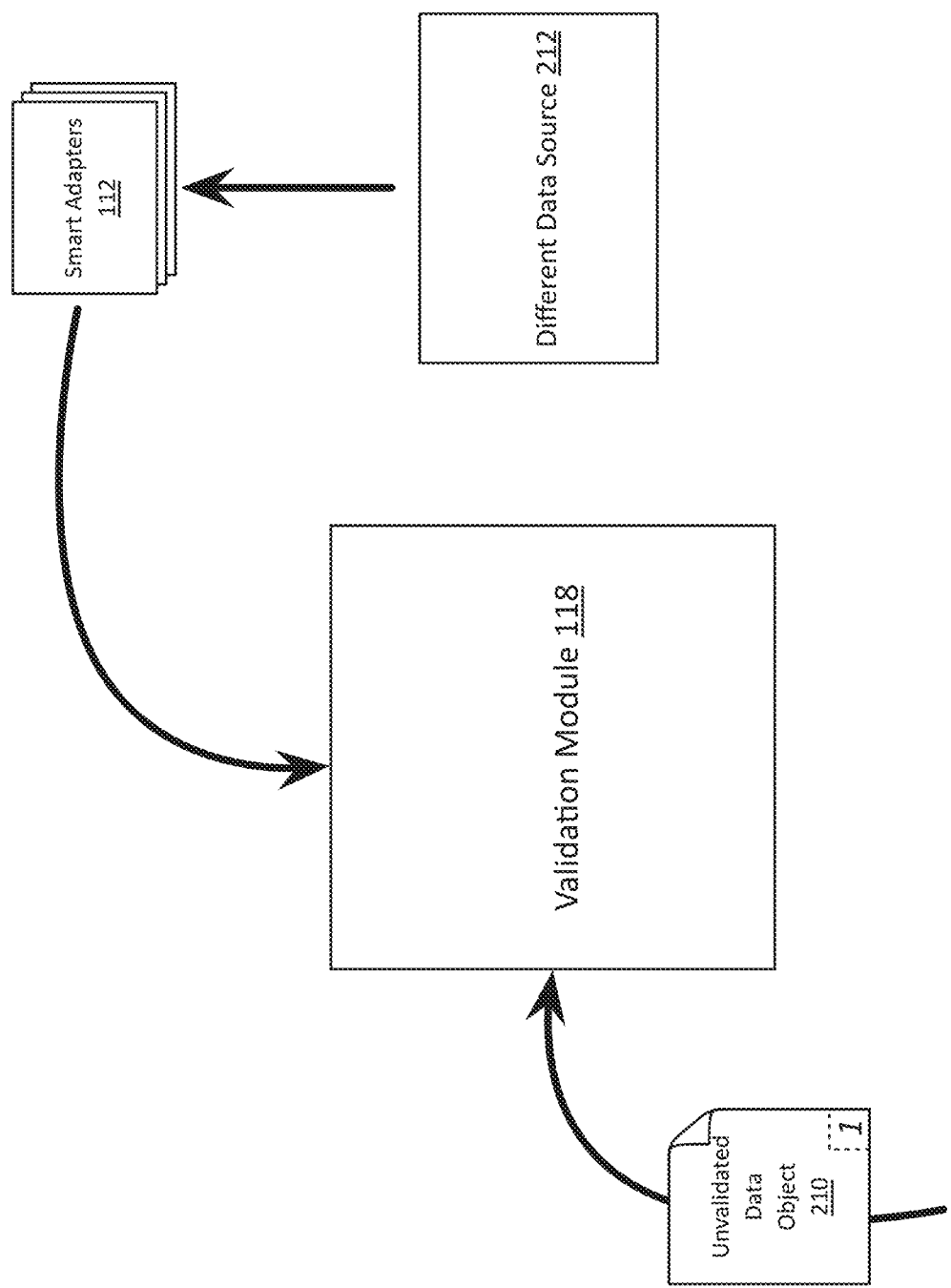
FIG. 2C is a schematic view of a validation module within a DAPA system.

FIG. 2C is a schematic view of a non-limiting example of a validation module within a DAPA system 100. The validation module 118 is used to validate data objects (e.g. unvalidated data object 210, etc.) passing through the DAPA system 100. This helps ensure consistency, catching errors before they create problems further down the line. In some embodiments, that validation may comprise making sure the data is internally consistent (e.g. comparison with checksum, comparison of one data field with data in related field, etc.). The validation may also comprise determining whether the unvalidated data object 210 conforms to the schema of the last smart adapter 112 it passed through.

In some embodiments, the validation comprises making sure the data is consistent with a different data source 212. As a specific example, a DAPA system 100 being used to bridge between proprietary systems and a blockchain network may validate data objects using the immutable ledger of the blockchain network. Blockchain networks will be discussed in greater detail with respect to FIG. 4, below. Other examples of external or different data sources 212 include, but are not limited to, third-party servers, regulatory systems, historical data caches, and the like.

In some embodiments, a data object may be sent to the validation module 118 in-tact. In other embodiments, the validation module 118 may perform its validation directly on the data object, within volatile memory. For example, in one embodiment, a pointer to the data object's location within volatile memory may be passed to the validation module 118, which then uses the pointer to observe the data object within volatile memory. This may provide an advantageous increase in speed.

In some embodiments, if the validation module 118 determines that the data object has one or more faults, it may simply indicate this (e.g. send a message to the data object's origin using the last smart adapter 112, etc.). In other embodiments, the validation module 118 may attempt to correct the faults, if possible (e.g. if the validation module 118 has access to missing information, if a discrepancy or internal inconsistency can be reliably resolved, etc.). In such embodiments, the validation module 118 may modify the data object; otherwise, the validation module 118 may be limited to observation only.

Figure 2D:
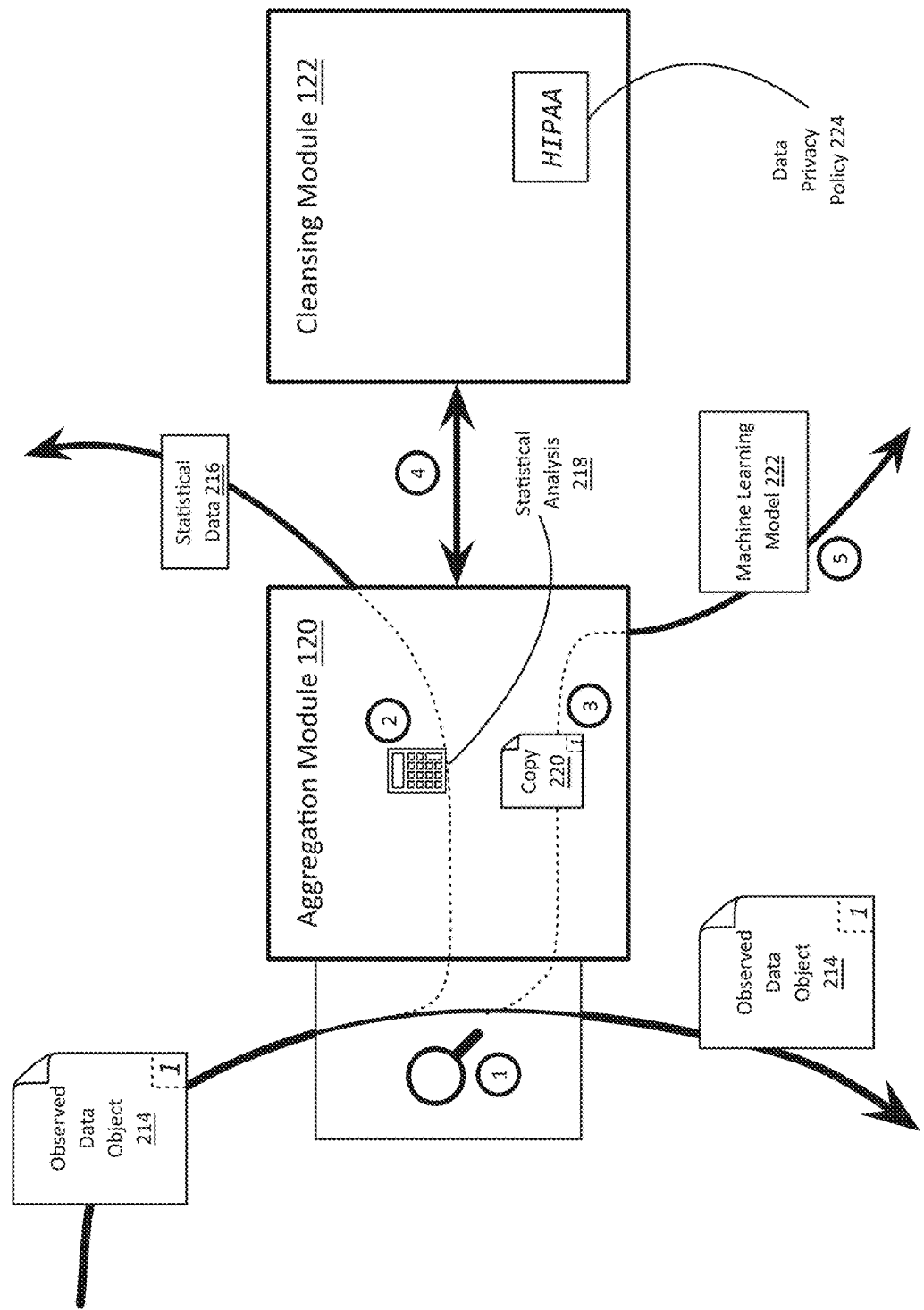
FIG. 2D is a process view of an aggregation module and a cleansing module within a DAPA system.

FIG. 2D is a process view of a non-limiting example of aggregation and cleansing modules within a DAPA system. The aggregation module 120 observes the data passing through the DAPA system 100, and is able to extrapolate additional data. According to various embodiments, this extrapolation may result in useful data ranging in sophistication from statistical information about the data objects to a machine learning model that may predict additional data of a similar nature.

As shown, the aggregation module 120 observes the data (e.g. observed data object 214) passing through the DAPA system 100. See 'circle 1'. According to various embodiments, the aggregation module 120 makes observations, and operates upon those observations, without significantly interfering with the observed data object 214. More specifically, the aggregation module 120 does not modify the observed data object 214; at most, it may slow it down as it moves between modules, but even then, any slowdown would be minimal, as will be discussed below.

In some embodiments, the observed data object 214 may be passed to the aggregation module 120 by reference. For example, in some embodiments, the aggregation module 120 may receive a pointer indicating the location of the observed data object 214 within volatile memory. The aggregation module 120 may immediately begin examining the observed data object 214 without having to wait for it to move. This may provide substantial speed advantages; in some embodiments, the data aggregation may be performed in near real-time, or close enough to real time that any impact on the overall performance of the DAPA system 100 is negligible.

In other embodiments, the observed data object 214 may be passed, as a whole, to the aggregation module 120. For example, in some embodiments where the DAPA system 100 is implemented in a distributed computing environment, the aggregation module 120 and hosting environment containing the observed data object 214 at the time the aggregation module 120 is engaged may not share the same volatile memory. In such cases, the observed data object 214 would need to be provided to the aggregation module 120 through the movement of the object within the computing environment of the system 100.

In some embodiments, the observation of the observed data object 214 by the aggregation module 120 may be limited to the gathering of statistical data 216 by performing a statistical analysis 218. See 'circle 2'. One example of the type of statistical data 216 that may be gathered is information about where the observed data object 214 came from, and where it is going. Such information may be used for billing in embodiments where the DAPA system 100 is being implemented as a service, or where the DAPA system 100 is providing a bridge into a managed system or network being offered to others as a service.

In some embodiments, the data gathered may be sizable. For example, in some embodiments, the aggregation module 120 may create a copy of the observed data object 214 as it is being examined. See 'circle 3'. This copy 220 of the observed data object may then be used in a secondary process. One advantage of creating a copy of the observed data object 214 is that the DAPA system 100 may continue working with the observed data object 214, shepherding it along to a final form and destination, without having to wait for the aggregation module 120 to finish an analysis or worry about corruption or modification of the data. As will be discussed in greater detail below, in some embodiments, the copy 220 of the observed data object may be used for modeling purposes, either within the aggregation module 120 or by sending it to a data science module, service, or team external to the DAPA system 100.

Advances in technologies such as machine learning and artificial intelligence have made data more valuable than ever. This increased value has been accompanied by an increase in the amount of data being captured and stored. The benefits available from collecting and analyzing this data, particularly sensitive data, are unfortunately accompanied by increased opportunity for abuse. Efforts have been made to mandate the protection of particularly sensitive information, such as health related data. For example, the Health Insurance Portability and Accountability Act of 1996 (HIPAA) dictates how sensitive data such as personally identifiable information (PII) and protected health information (PHI) is to be handled, what portion of that data can be shared, and who it can be shared with. Similarly, General Data Protection Regulation (GDPR) in the European Union (EU) dictates how sensitive data may be used, handled, or both, in the EU.

Compliance with regulations such as HIPAA and GDPR, as well as a growing uneasiness in the public regarding the sharing and use of personal information, stands as a barrier that slows and sometimes completely halts the beneficial use of the collected data. Having to redact portions of records before sharing them increases the cost of creating models and performing research, and also increases the overhead for monetization of the information.

The cleansing module 122 may be used to redact or otherwise de-identify sensitive data to sanitize the copy 220 of the observed data object to place it in compliance with a data privacy policy (e.g. HIPAA, GDPR, privacy policy defined by a corporation or promised to users, etc.) before being sent on for consumption. See 'circle 4'. The scrubbing of this data expands the ways it can be used, potentially opening up new revenue streams, research opportunities, and the creation of new data science models.

In some embodiments, the cleansing module 122 receives data objects, such as the copy 220, having fields have been tagged or labeled, and performs various operations on the value of each data field based upon a tag and a corresponding operation in a predefined data privacy policy 224. According to various embodiments, these operations are evaluated at runtime, and are performed directly on the data as it exists in the volatile memory of a trusted computing environment, providing flexibility, efficiency, and security. The cleansing module 122 may be quickly modified to adapt to regulatory or other changes, without having to reprocess a large body of data.

In other embodiments, the data object being cleansed may not have tagged fields. In some embodiments, the aggregation module 120 may add tags to the fields using the schema 200 from the appropriate smart adapter 112. For example, in one embodiment, the aggregation module 120 may pick apart the copy 220, tag the data fields as it feeds them one at a time to the cleansing module 122, which may operate on them in volatile memory. Such an arrangement may be beneficial in embodiments where the original observed data object 214 was not available to the aggregation module 120 in volatile memory (e.g. due to architecture of a distributed computing environment, etc.). In other embodiments, the cleansing module 122 may determine what each field is, using the appropriate schema 200.

This approach to data sanitization is advantageous over conventional methods of redacting sensitive information for a number of reasons. By operating on the data as it exists in volatile memory, high throughput streaming of clean, sharable data is possible, without risking the creation of a vulnerable surface area. Additionally, the ability to provide real-time or near real-time cleansed information (such as providing data within milliseconds, e.g. 0-5 milli seconds, or within a few minutes, e.g. 0-5 minutes) provides new opportunities for research and oversight. For example, by providing a high throughput stream of cleansed, HIPAA-compliant clinical and billing information, regulatory and research organizations may observe changes in population health, as well as detect and address problems sooner, minimizing their negative effect. The cleansing module 122 contemplated herein may facilitate the application of modern data science methodologies, such as the creation of predictive models, and may also open up new revenue streams otherwise not feasible due to the speed and cost of conventional redaction systems and methods.

Many of the non-limiting examples of how the cleansing module 122 may be applied deal with redacting sensitive medical information. However, it should be noted that the aggregation module 120 and cleansing module 122 contemplated herein may be applied to a wide range of other industries and data types, including but not limited to financial records (e.g. bank statements, tax returns, etc.), proprietary research data, and the like. Additionally, the cleansing module 122 may also be applied to the obfuscation of data that is not necessarily sensitive (i.e. it does not pose potential harm in its exposure), but may be beneficially obfuscated for other reasons. As a specific example, some embodiments of the contemplated DAPA system 100 may be employed by an entity who makes varying grades of information available to consumers who have the option to pay a higher price for greater precision. The system 100 and method contemplated herein may be used to provide said data in real-time or near real-time, as a high throughput stream, at various degrees of obfuscation. Exemplary data includes but is not limited to satellite imagery, weather data, location tracking data, industry and financial market data, and the like. This may provide a revenue stream that may be external to the activities that caused the data to pass through the DAPA system 100 in the first place.

According to various embodiments, the data sanitization process may be as simple as applying a filter, such as a regular expression, that removes or modifies portions of a data field (e.g. removing all but the domain name from an email address). In other embodiments, a cleansing operation may comprise logic operations that branch, treating the data within a field based on one or more conditional statements. For example, in one embodiment, an operation performed on a "state" field may empty the field if the field contains "Arizona", and may replace the field with "redacted" if the field contained any state other than "Arizona".

After the contents of the copy 220 of the observed data object have been sanitized to comply with the data privacy policy 224, the copy 220 may be used to create a machine learning model 222. See 'circle 5'. In some embodiments, the aggregation module 120 may generate this model 222, while in other embodiments the modeling may be done using a system external to the DAPA system 100, or may be turned over to a human data science team for consideration. In some embodiments, the resulting models 222 may be used to enhance or evolve the rules engine 114, as will be discussed further, below.

Figure 2E:
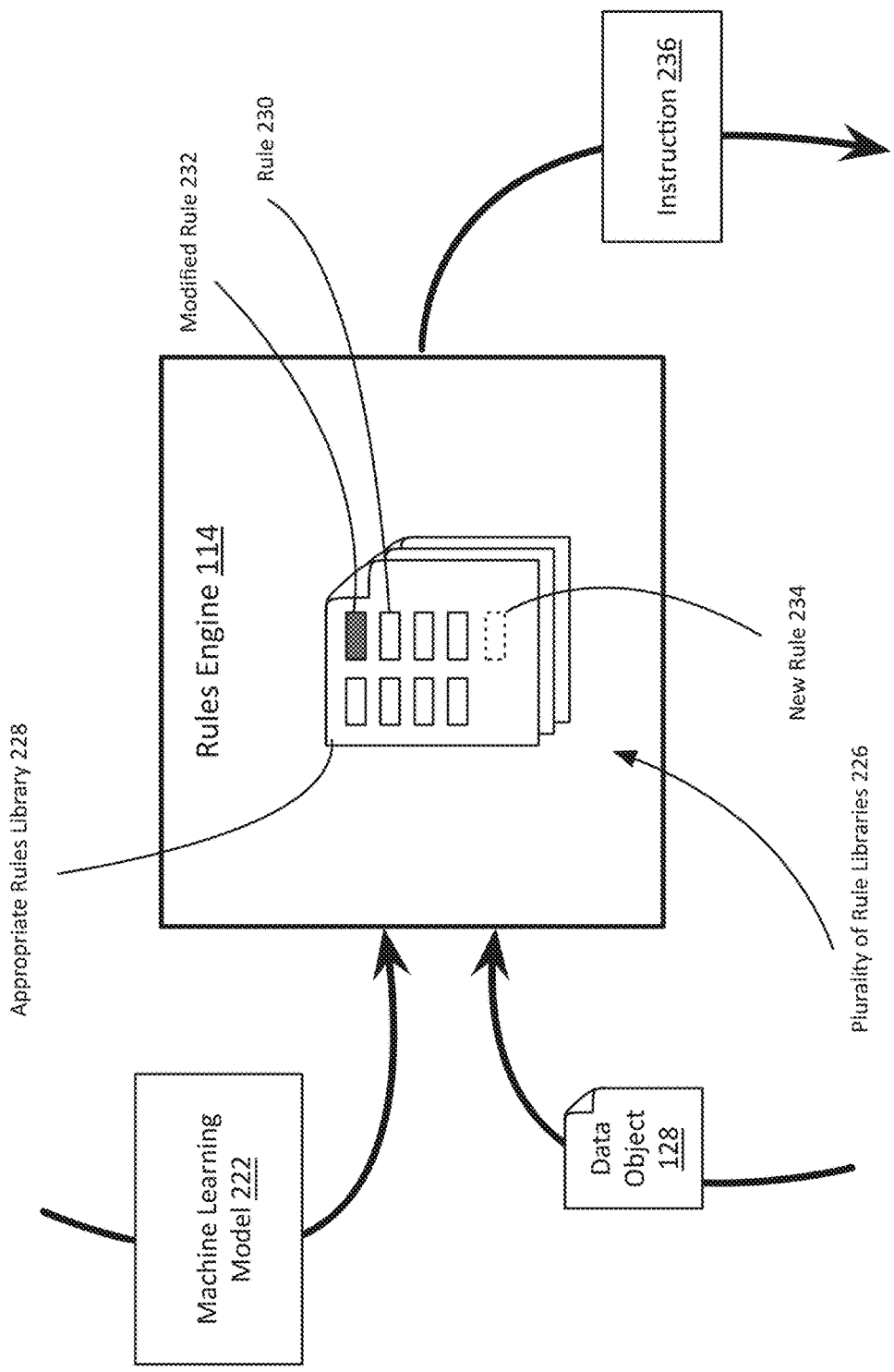
FIG. 2E is a schematic view of a rules engine within a DAPA system.

FIG. 2E is a schematic view of a non-limiting example of a rules engine 114 within a DAPA system 100. In the context of the present description, a rules engine 114 is a module able to drive the various components and modules within the DAPA system 100, based upon defined logic embodied in one or more rules 230. According to various embodiments, the rules engine 114 is like a supervisor within the DAPA system 100, able to see the big picture and issue instructions 236 to the various modules, guiding them to perform their individual jobs to accomplish the overall goal. When a data object 128 is received at a smart adapter 112, the rules engine 114 determines what needs to be done in response, such as how the data object 128 needs to be transformed or where it needs to go to accomplish the task for which the data object 128 was intended.

While the various modules discussed herein are capable of performing their various tasks, the rules engine 114 is what decides how they are to be used, and what functions they are to perform, according to various embodiments. In some embodiments, one or more of those modules may have their own embedded (or in some embodiments, dynamic) rules and logic. In other words, the rules engine 114 may act as a "hands off" supervisor, giving individual modules instructions 236 but relying on them to know how to get the job done. For example, in one embodiment, the cleansing module 122 may receive instructions to cleanse data objects 128 to comply with privacy regulations, but may already contain the logic needed to accomplish that task (e.g. it knows how to handle the various situations that may arise in the context of sanitizing data objects, etc.). In other embodiments, the rules engine 114 may be a micromanager; all of the rules and logic used by the various modules within the DAPA system 100 may be contained within and executed by the rules engine 114. In still other embodiments, the modules may have some hardwired rules (e.g. default rules to follow in the absence of explicit instruction, etc.) while also able to receive instruction from the rules engine 114, which may be able to override the hardwired rules.

Conventional integration systems have rules and business logic embedded, making them difficult to change. Advantageous over these conventional systems, the rules engine 114 is dynamic, according to various embodiments. The rules 230 are able to be defined, manipulated, and expanded without requiring recoding, recompiling, or even restarting the engine or DAPA system 100.

According to various embodiments, modifications can be made to the rules 230 used by the rules engine 114 with little to no interruption to the services being provided. According to various embodiments, the dynamic nature of the rules engine 114 may be achieved through defining the rules 230 using a language that supports runtime reflection, such as Go, allowing the rules 230 to be defined as data that is evaluated at runtime. This is advantageous over static or precompiled rules, allowing for the rules 230 to be defined or redefined at runtime, resulting in an agile system that can quickly adapt to changes in regulation, policy, membership, or goal, without recompiling or significant interruption to operation. Those skilled in the art will recognize that this flexibility may be accomplished with languages supporting runtime reflection, as well as hybrid solutions that incorporate some form of scripting that is evaluated at runtime rather than when the system is compiled (e.g. rules 230 defined by scripts external to the code of the rules engine 114 itself, etc.).

When a new integration point is being incorporated into the realm of systems the DAPA system 100 can talk with, a new set of rules 230, or rules library 226, may be defined alongside one or more smart adapters 112. Like the smart adapters 112, a boilerplate set of rules may provide a starting point, which may then be tailored for that particular integration point. As an example, the on-boarding of a medical insurance company to a health care network bridged by a DAPA system 100 may involve, among other steps, the definition of rules specifying how data should be validated, allowed data structures and formats, what data can be passed to data science and how it should be cleansed (e.g. that company may implement privacy rules more stringent than HIPAA, etc.), what integration points should receive certain types of transmissions (e.g. coverage verification vs. preauthorization, etc.).

According to various embodiments, rules 230 may be organized into one or more rules libraries 226. In the context of the present description and the claims that follow, a rules library 226 is a collection of rules 230 that are applicable for a specific subset of interactions with the DAPA system 100. For example, some rules libraries 226 are defined by the type of integration point being interacted with, while other rules libraries 226 are defined by the identity of a participating entity. In other words, a DAPA system 100 may service multiple organizations that are in the same industry (e.g. five health insurance companies, etc.), but each may have their own set of rules to be applied as part of their interactions with other entities, both initiated by them as well as initiated by others. As a specific example, in one embodiment, a healthcare provider may have their own set of rules 226 to handle their various requests delivered in the data formats used by their proprietary systems, etc.).

In some embodiments, rules libraries 226 may be defined based on the general type of adjudication being performed. For example, a human resources department of a corporation may define one rules library 226 for determining an appropriate disciplinary action for an employee, and another library 226 for determining candidates for internal promotion.

In other embodiments, rules libraries 226 may be organized based upon an initial rule that logically splits different sets of rules that may all be directed to the same general type of inquiry or request. For example, a medical insurance provider may define a different rules library 226 for each healthcare provider they interact with, reflecting different policies in place for dealing with each provider based on their history (e.g. prior authorization may be required more frequently for a provider with whom the insurer has had problems within the past, etc.). In still other embodiments, all rules 230 in a system 100 may be organized in a single, universal rules library 226, relying on the evaluation of the rules 230 to direct inquiries down the correct logical path. Those skilled in the art will recognize that rules 230 may also be organized in other structures and containers known in the art.

According to various embodiments, the rules libraries 226 may be stored in a storage 108, which may be a database or other storage system known in the art. In some embodiments, rules 230 may be stored with an associated identification code or index, which can be referenced in resulting logs or transaction ledgers.

Upon receiving a data object 128 from, for example, a smart adapter 112, the first task of the rules engine 114 is identifying an appropriate rules library 228 from among a plurality of rules libraries 226. In the context of the present description and the claims that follow, an appropriate rule library 228 is a rule library 226 that matches at least some of the characteristics of an interaction (e.g. data object origin, data object format, a request or inquiry within the data object, data object destination, etc.). In some embodiments, determining the appropriate rule library 228 may also take into account who is making the request and/or of whom that request has been made. As a specific example, an insurance company may have worked out different deals with different providers, and the way a request is evaluated and routed may depend on who is rendering the desired treatment.

In some embodiments, the appropriate rules library 228 will indicate the ultimate destination of the data object 128 (e.g. the second integration point 126, etc.). For example, in one embodiment, a data object 128 sent by a first integration point 124 may contain patient information, treatment information, and insurance information, and a request for prior authorization. The appropriate rules library 228 may identified using the identity of that patient's insurance provider, and that rules library 228 may indicate which smart adapter 112 to use to complete the interaction after the data object has been transformed as needed for the insurance provider.

According to various embodiments, the rules 230 may be stored in a human-readable format 208. In the context of the present description and the claims that follow, a human-readable format 208 is a format that conveys the elements of a rule using a natural or ordinary language, meaning a language that is spoken and/or written by humans to communicate with each other. In some embodiments, a rule 230 or even an entire rule library 226 may be stored using a JSON or XML format.

The use of a human-readable format is advantageous over other systems for a number of reasons. First, it facilitates the creation and modification of rules 230 by those responsible for making a decision, rather than requiring a programmer to function as an intermediary. As will be discussed below, in some embodiments, the rules engine 114 may be configured to render some decisions without having to pass a data object 128 on to a second integration point 126 for consideration. Also, using a human-readable format 208 increases transparency; an individual can look over a log of each rule evaluation that led to a particular result and see exactly what was considered and with what criteria. Another advantage of storing the rules 230 in a human-readable format 208 is that the rules are evaluated at runtime, rather than precompiled and static at runtime, according to various embodiments.

According to various embodiments, the DAPA system 100 remembers where requests or other interactions come from, such that when the interaction results in a response or other data being sent back to the DAPA system 100, the rules engine 114 knows how to transform it and where to send it. Additionally, in some embodiments, the rules engine 114 may pull information from other sources to "hydrate" data objects 128 that it determines are lacking information, particularly mission-critical information. For example, the rules engine 114 may, in response to receiving data from one source, hydrate a more robust data object by obtaining more information from a different integration point. As a specific example, the rules engine 114 may check for primary and secondary insurance coverage for a patient whose records were received from a hospital with only basic insurance information.

In some embodiments, the rules engine 114 may implement rules 230 and logic solely focused on facilitating communication between systems. In other embodiments, the rules engine 114 may also be used to automate processes, removing the need for interaction with the second integration point 126 by automatically performing the desired operation using defined rules 230. As a specific example, a DAPA system 100 implemented in a network of health care payers and providers may comprise a rules engine 114 and rules libraries 226 that are able to make preauthorization determinations, in some cases, based entirely on data received from a provider (e.g. hospital, etc.) without having to query a second integration point 126 (e.g. the proprietary system of an insurer) by using rules defined by the insurer. Such automation allows for real time, or near real-time responses to many queries that in conventional systems can require hours or even days, as well as attention from a human who would be better utilized making determinations on difficult edge cases.

According to various embodiments, a party or entity is able to define a series of rules 230 that codify their intentions for a particular endeavor or determination, whether it be the fair application of employment policy, the determination of the boundaries of an insurance policy and what requires prior authorization, or even the consistent application of laws and regulations. Once defined, the rules 230 may be applied by the rules engine 114 to address a specific inquiry or request for a decision, providing immediate feedback without the need for any intermediate human intervention.

First, the rules engine 114 may attempt to generate a response data object on behalf of the second integration point 126 by applying at least one rule 230 of the appropriate rules library 228 defined to address the inquiry. This response data object would be in the first data object format 202a, according to various embodiments. If successfully generated by the rules engine 114, this response data object would be sent back to the first integration point 124. According to various embodiments, if the rules engine 114 is not able to handle the request or inquiry by itself, it may continue the application of the appropriate rules library 226, ultimately sending the request for evaluation at the second integration point 126.

The rules-driven DAPA system 100 contemplated herein provides many advantages over conventional methods of rendering a decision. The DAPA system 100 can provide a decision on a matter in a matter of seconds, rather than the hours, days, or even weeks required by conventional methods. Some embodiments of the DAPA system 100 log every step of the evaluation of a request, which may be used to provide a reason for the decision that was rendered, a level of transparency that would otherwise be difficult or impractical to provide.

The DAPA system is advantageous over conventional methods and systems for enacting policies because it applies the rules defined by a party consistently, and without bias. Furthermore, the system and method contemplated herein can enact and enforce rule sets that would be too large and/or complicated for consistent and efficient application by human representatives. For example, the policies surrounding what is and is not covered by a particular medical insurance policy for a particular condition can be complicated, and subject to misinterpretation by the humans that conventional methods rely on. An additional advantage is that, by logging each step of the rules application process, the DAPA system 100 may facilitate oversight of that particular process, whether by a regulator agency or by the rule-defining party itself.

In some embodiments, an authorized party may interact with the rules engine 114, or some other aspect of the DAPA system 100, to provide new or modified rules for application. In some embodiments, the party may submit new 234 or modified 232 rules through a smart adapter 112, like the other interactions discussed above. In other embodiments, the party may interact with the rules engine 114 through a different interface specific for the creation and maintenance of rules 230 and rules libraries 226. Said interface may be implemented using any method known in the art, including but not limited to an API, a web interface, an application, and the like. Once a new rule 234 has been provided to the DAPA system 100, and it has been received and stored within a rules library 226, no further human interaction is needed, unless the party would like to update the rule.

As mentioned above with respect to the aggregation module 120, in some embodiments the DAPA system 100 may be used to copy data object 128 for the creation of data science or machine learning models 222. These models 222, in turn, may be used to modify one or more of the rules 230 already implemented by the rules engine 114, or even create new rules 234.

Returning to the previous example, as the aggregation model 120 passes data through the cleansing module 122 and then on to a data science team, the relationship between patient data and the results of preauthorization determinations made by humans (i.e. cases that fell outside the defined rules) can be modeled. The resulting models 222 can be used to update the rules 230 to reduce the number of cases needing human consideration, increasing the responsiveness and efficiency of the overall process. The models 222 may be continually updated and refined as more and more historical data moves through the DAPA system 100. In some embodiments, this evolution of rules may be automated, while in others the results may be presented for human consideration before implementation. As mentioned before, changes to the rules may be done with little to no disruption of the system.

In some embodiments, the rules engine 114 may be specific to the DAPA system 100, while in other embodiments, the rules engine 114 may be external to the DAPA system 100 (e.g. it controls more than just the DAPA system 100, etc.). In embodiments where the rules engine 114 is not exclusive to the DAPA system 100 and may be instantiated or hosted outside the rest of the DAPA system 100, it may receive data objects 128 from the smart adapters 112 and issue instructions 236 to the various modules (e.g. transformation module 116, validation module 118, etc.) through some form of communications network including, but not limited to, a physical network 110 (e.g. the Internet, etc.) or an abstracted network such as a permissioned blockchain network, which will be discussed in greater detail with respect to FIG. 4, below.

Figure 3:
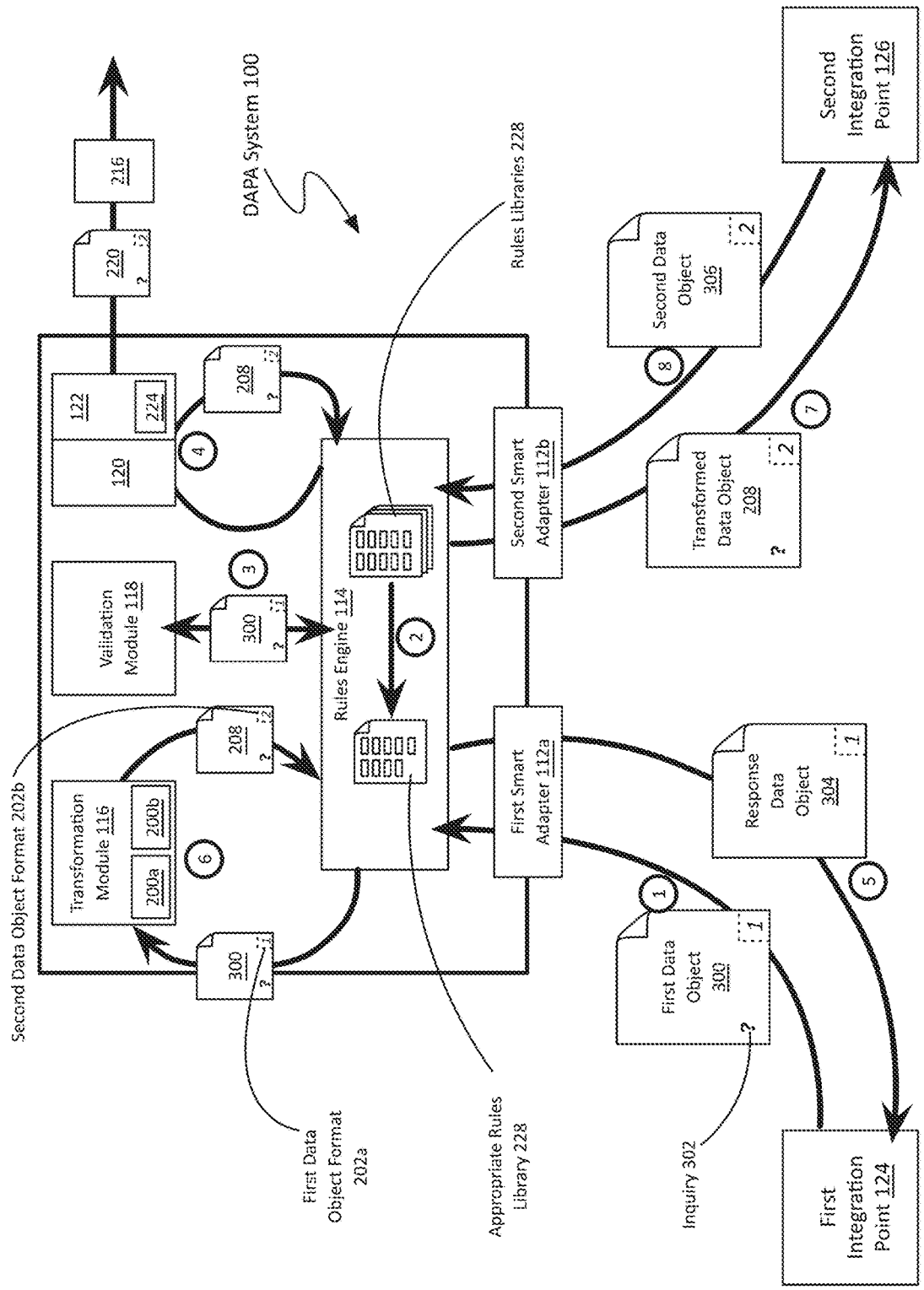
FIG. 3 is a process view of DAPA system.

FIG. 3 is a process view of a non-limiting example of a DAPA system 100 being applied. Specifically, FIG. 3 shows a DAPA system 100 receiving, and subsequently operating upon, a first data object 300 sent from the first integration point 124 to the second integration point 126. It should be noted that, although this non-limiting example shows a one-way interaction between two integration points, in other embodiments the interaction may be two-way. Two-way communication will be discussed in the context of a specific use case shown in FIG. 5, below.

First, a first data object 300 is received from the first integration point 124. See 'circle 1'. It should be understood that enumerated elements of this non-limiting example of a DAPA system 100, such as the first and second integration points as well as first and second smart adapters, are representative of the elements involved in this particular example. According to various embodiments, a DAPA system 100 may facilitate the interaction between a plurality of integration points, in some cases a large number of integration points. As previously discussed, the DAPA system 100 may have a separate smart adapter 112 for each of these integration points, in some embodiments.

In some instances, the first data object 300 may comprise information that is being sent to the second integration point 126, for any of a number of reasons (e.g. the second integration points 126 requested the data object from the first integration point 124, the first integration point 124 has been configured to periodically report to the second integration point 126 using the first data object 300, etc.). According to various embodiments, in some cases, a data object 128 may include information specifying a desired action or requested information to be provided by the second integration point 126, and may further comprise information that may be needed for the second integration point 126 to accomplish the desired action or generate the requested information.

As shown, the first data object 300 comprises an inquiry 302 to be answered by the second integration point 126. Examples of types of inquiries 302 include, but are not limited to, information requests (e.g. request for specific information only accessible to the second integration point 126, request for information identifiable using additional information transmitted within the first data object 300, etc.), determination requests (e.g. request for the second integration point 126 to generate information or a value by applying logic to information provided in the first data object 300, request for applying predefined rules to a scenario defined by information included in the first data object 300 to arrive at a conclusion on behalf of the party represented by the second integration point 126, etc.), action requests (e.g. request for the second integration point 126 to take an action whose influence is not confined to the DAPA system 100 and associated integration points, request for the hardware hosting the second integration point 126 to take an action, etc.), and the like.

As shown, the first data object 300 is received by the first smart adapter 112a, which is configured to send and receive data objects 128 to and from the first integration point 124. In some embodiments, the smart adapters 112 may also automatically transform incoming data objects 128 into a standardized format understood by all of the modules within the DAPA system 100. In other embodiments, such a transformation may be automatically performed, but performed by the transformation module 116. In still other embodiments, including the non-limiting example shown in FIG. 3, incoming data objects 128 may first be sent to, or inspected by, the rules engine 114. In some embodiments where the format of incoming data objects 128 is normalized automatically, the resultant normalized data object 128 may be then sent to the rules engine 114, for further processing.

According to various embodiments, the first thing the rules engine 114 does upon receipt of a data object 128 (or, in some embodiments, receipt of a pointer to the location of the data object 128 within the volatile memory 104 of the DAPA system 100) is identify an appropriate rules library 228. See 'circle 2'. As previously discussed, in some embodiments, the appropriate rules library 228 is identified from among a plurality of rules libraries 226 using, at least in part, the incoming data object 128 which, in FIG. 3, is the first data object 300. According to various embodiments, the appropriate rules library 228 comprises at least one rule 238, as well as an indication of which smart adapter 112 is the second smart adapter 112b (i.e. the intended destination of the first data object 300 after the application of the appropriate rules library 228).

Once identified, the appropriate rules library 228 dictates subsequent actions. It should be noted that, while the following is an exemplary sequence of steps that may be taken by the DAPA system 100, the various modules may be employed in different orders according to various embodiments. For example, in some embodiments, a data object 128 may be validated before being transformed by the transformation module 116, while in other embodiments a data object 128 may be transformed, either to a normalized data format specific to the internal modules of the DAPA system, or the second data object format of the second smart adapter 112b. In still other embodiments, the modules may be employed in any order specified in the appropriate rules library 228.

In some embodiments, the rules engine 114 may instruct the validation module 118 to validate the first data object 300. See 'circle 3'. According to various embodiments, the validation may comprise comparing the first data object 300 with another data source including, but not limited to, a data store external to the DAPA system 100, the ledger of a blockchain network, the internal storage 108 of the DAPA system 100, an external server, and the like. In some embodiments, the validation may also include determining if the first data object 300 is internally consistent, as previously discussed. In some embodiments, the validation may be performed after the first data object 300 has been transformed into a different format, instead of being applied to the first data object 300.

According to various embodiments, after validation, the first data object 300 (or a transformed data object 208, as discussed above) may be exposed to the aggregation module 120. See 'circle 4'. The rules engine 114 instructs the aggregation module 120 to observe the first data object 300 and perform a statistical analysis 218 to generate statistical data 216, according to various embodiments. In some embodiments, the rules engine 114 may instruct the aggregation module 120 to observe a transformed data object 208 (i.e. the first data object 300 after it has been transformed to be compatible with the second integration point 126).

In some embodiments, the rules engine 114 may instruct the aggregation module 120 to observe every data object 128 passing through the DAPA system 100, while in other embodiments, the rules engine 114 may only instruct said observation to be performed on a subset of all the data objects 128 passing through the system 100. For example, in one embodiment, the rules engine 114 may only instruct the aggregation module 120 to perform a statistical analysis 218 on data objects 128 arriving from, or being sent to, a particular class of integration points. As a specific example, a DAPA system 100 may be established for use by an entity for a specific reason. Upon determining that the DAPA system 100 has a great deal of available capacity, the DAPA system 100 is provided in a SaaS context. Data objects 128 flowing from, or to, a set of integration points associated with the various clients making use of the system 100 as a service may be observed and analyzed by the aggregation module 120, and the gathered statistical data 216 may be used to bill for the services rendered.

In some embodiments, the aggregation module 120 may also create a copy 220 of the first data object 300 or the transformed data object 208 (as shown in FIG. 3). These duplicated data objects 220 may be used to develop and/or refine a model, such as a machine learning model 222, as discussed above. This modeling may be performed by the aggregation module 120 in some embodiments, while in other embodiments the copies 220 may be sent to a system or group outside of the DAPA system 100 for modeling.

In some embodiments, the appropriate rules library 228 that is being implemented by the rules engine 114 may be limited to the order and parameters provided to various modules, for the preparation of the first data object 300 to be ingested by the second integration point 126, where an inquiry 302 within the data object may be evaluated. In other embodiments, depending on the rules 230 within the appropriate rules library 228, the rules engine 114 may attempt to generate a response data object 304 that responds to the inquiry 302. The response data object 304 is subsequently sent back to the first integration point 124 through the first smart adapter 112a. See 'circle 5'.

The ability of the rules engine 114 to handle some inquiries 302 without needing to interact with the second integration point 126 is advantageous for a number of reasons. Performing the evaluation within the DAPA system 100 reduces the steps involved to get a response data object 304 back to the first integration point 124. This also reduces the load placed on the second smart adapter 112b, the transformation module 116, and the second integration point 126.

If the rules engine 114 is able to successfully answer the inquiry 302 of the first data object 300, it is incorporated into a response data object 304 and sent to the first integration point 124 via the first smart adapter 112a. In the cases where the rules engine's 114 attempt to generate a response data object 304 on behalf of the second integration point 126 fail, or are not possible with the appropriate rules library 228 (e.g. the appropriate rules library 228 does not have the rule(s) 230 that address the inquiry 302, etc.), the rules engine 114 may continue to apply the remaining rules 230 of the appropriate rules library 228.

In some embodiments, if the rules engine 114 is not able to satisfactorily answer the inquiry 302 of the first data object 300, then said inquiry 302 and accompanying information will need to be sent to the second integration point 126, where the inquiry 302 will be addressed. Thus, at some point, the rules engine 114 will need to instruct the transformation module 116 to transform the first data object 300 into the transformed data object 208. See 'circle 6'. As previously discussed, the transformation module 116 utilizes the data formats defined in the first schema 200a provided by the first smart adapter 112a and the second schema 200b provided by the second smart adapter 112b, according to various embodiments.

In some embodiments, shuttling a first data object 300 from the first integration point 124 to the second integration point 126 may comprise a single transformation by the transformation module 116, taking the data object from the first data object format 202a and reformatting it to be in the second data object format 202b.

In other embodiments, such a conveyance from the first integration point 124 to the second integration point 126 may comprise two transformations. The first transformation would take the first data object from the first data object format 202a to a standardized or neutral data object format that is well understood by all of the modules of the DAPA system 100 (i.e. the tags that would be assigned to each field within a data object in this standardized format are known). The second transformation would take the data object 128 from the standardized data object format into the second data object format 202b, which is the "native language" of the second integration point 126. Such an arrangement may be advantageous, as it would allow the modules within the DAPA system 100 to be written to expect all interaction to occur with data objects 128 having that standardized format. This would allow the modules to follow a different development path than the smart adapters 112. The addition of a new integration point would only require the definition of a new smart adapter 112, rather than requiring tweaks to be made to the modules internal to the DAPA system 100.

Once the transformed data object 208 has been created by placing the first data object 300 into the second data object format 202b, it may be sent to the second integration point 126. See 'circle 7'. According to various embodiments, the transformed data object 208 is sent to the second integration point 126 through the second smart adapter 112b. It should be noted that, throughout this non-limiting example, it is assumed that the first data object format 202a is different than the second data object format 202b, thus requiring the transformation. In scenarios where the two integration points utilized identical data object formats (e.g. two hospitals using the exact same EMR software, etc.), the transformation module 116 may not be instructed by the rules engine 114.

As shown, the transformed data object 208 still comprises the inquiry 302 of the first data object 300 (though the transformation may have placed it into a different format that is preferred by the second integration point 126). Upon receipt of the transformed data object 208 from the second smart adapter 112b, the second integration point 126 may proceed to generate a reply to the inquiry 302. According to various embodiments, the second integration point 126 may prepare and send a second data object 306 that indicates the result of evaluating the inquiry 302 (e.g. a definite answer, an indication that an answer could not be obtained, an indication of an error, etc.). The second data object 306 is in the second data object format 202b, and is sent to the second smart adapter 112b, according to various embodiments. See 'circle 8'. After passing through the transformation module 116, this data object 128 may become a response data object 228, that is in the first data object format 202a, according to various embodiments.

Figure 4:
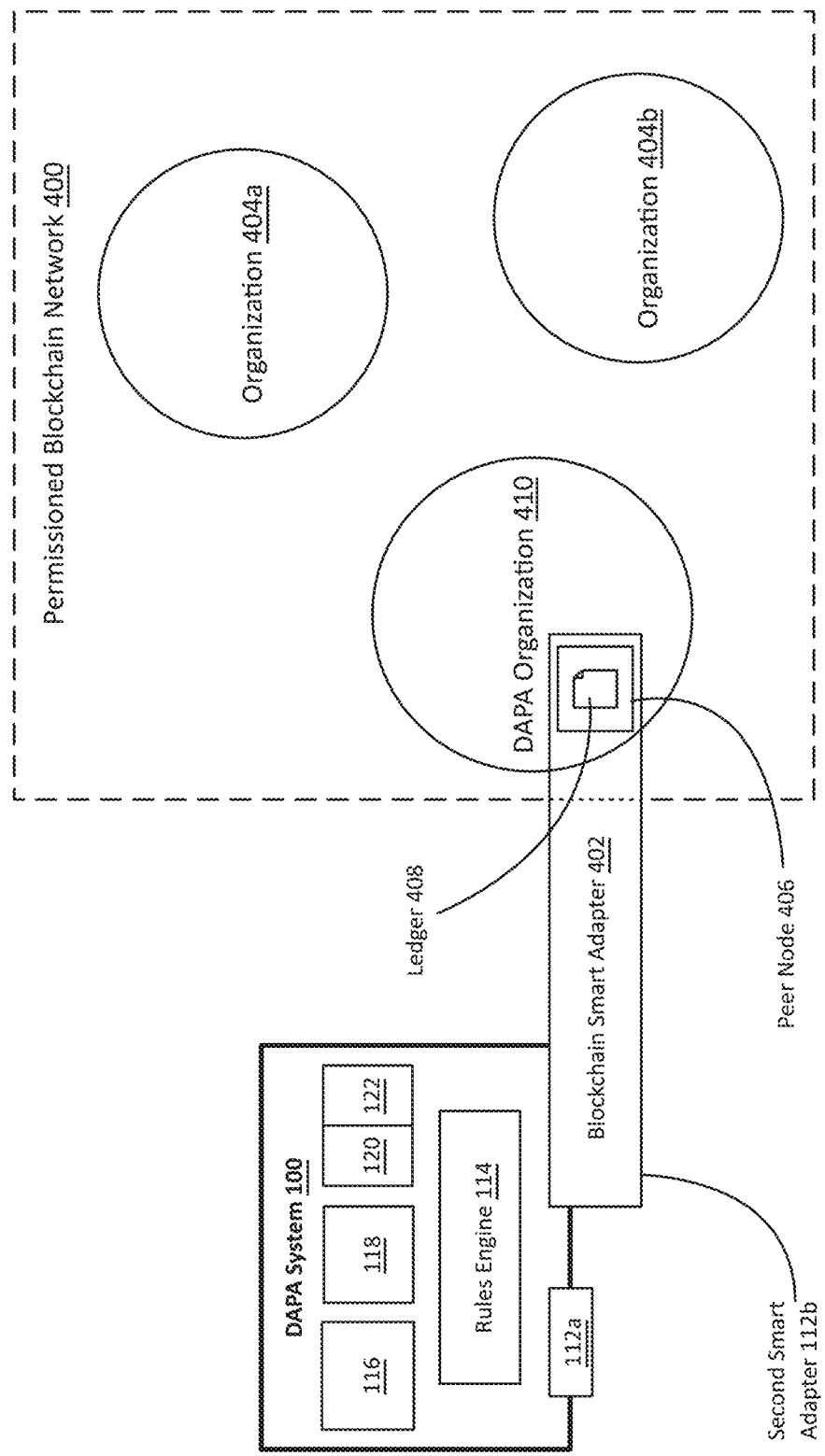
FIG. 4 is a schematic view of a DAPA system coupled to a permissioned blockchain network.

FIG. 4 is a schematic view of a non-limiting example of a DAPA system 100 coupled to a permissioned blockchain network 400 through a blockchain smart adapter 402. In the context of the present description and the claims that follow, a permissioned blockchain network 400 is a blockchain network that does not accept transactions from network entities that do not possess valid cryptographic identities issued by an approved member of the network. This is different from open, permission-less blockchain networks that allow unknown identities to participate, requiring protocols like "proof of work" to validate transactions and secure the network. A non-limiting example of a permissioned blockchain network is a Hyperledger Fabric network. Those skilled in the art will recognize that the system and method contemplated herein may be applied to other permissioned blockchain networks.

The use of a permissioned blockchain network 400 is advantageous, as it facilitates cooperation between multiple parties, even when they have diverging business interests. For example, in one embodiment, a permissioned blockchain network 400 may be established to connect various healthcare providers (e.g. hospitals, clinics, labs, etc.) with various healthcare payers (e.g. insurance companies, government benefits, etc.). Both types of party is interested in the health of patients/policy holders. However, the providers want to make the most money while providing the best medical service, and the payers want to make the most money by denying as many claims as possible. These opposed business interests are not conducive to trust, even though both side would benefit from the increase efficiency made possible by closer collaboration. Transacting there business with each other through a permissioned blockchain network 400 would remove the need to trust the other parties, as the immutable ledger 408 that contains all transactions will serve to keep everyone honest.

As shown, a permissioned blockchain network 400 may comprise a number of different elements, including organizations 404 and peer nodes 406. In the context of the present description and the claims that follow, an organization 404 is the representation of a party within the permissioned blockchain network 400; the party is able to make use of resources provided on the blockchain network 400 (e.g. smart contracts/chaincode linked to APIs, data stores, etc.), as well as make resources available. The party being represented may be as large as a multinational corporation or as small as a single individual.

Each organization 404 comprises a plurality of peer nodes 406. It is through these peer nodes 406 that an organization 404 is able to interact with the rest of the permissioned blockchain network 400. In the context of the present description and the claims that follow, a peer node 406 is a network object that maintains a copy of the blockchain ledger 408, and is able to execute chaincode or smart contracts 206, access ledger 322 data, endorse transactions 324, and otherwise interface with other organizations 404, applications, and/or resources on the permissioned blockchain network 400.

Those skilled in the art will recognize that other nodes and elements common to permissioned blockchain networks 400 are not shown in FIG. 4 (e.g. an ordering service, orderer nodes, organization membership service nodes, certificate authority nodes, etc.), and are not pertinent to the present discussion. Another example is smart contracts. In the context of the present description, a smart contract, or chaincode, is a series of logic operations or steps that represent a procedure being executed on behalf of an organization. According to various embodiments, smart contracts identify what information is needed, where it needs to come from, what peers 406 need to sign and/or how many peers 406 need to sign, the criteria for rendering a decision, and any other evaluation or function that may be involved in automating a particular procedure, evaluation, or transaction.

As shown, some embodiments of a DAPA system 100 include a blockchain smart adapter 402, allowing data objects 128 to be sent to and received from organizations 404 within the blockchain network 400, including segments of the immutable ledger 408 held within each peer node 406. As shown, the blockchain smart adapter 402 comprises at least one peer node 406. In some embodiments, that peer node 406 may be hosted in a computing environment that is shared by the DAPA system 100, or part of the DAPA system 100. In other embodiments, that peer node 406 may be instantiated elsewhere, using any method known in the art, so long as the rules engine 114 is able to interact with it through the blockchain smart adapter 402.

With respect to FIG. 4, if the blockchain smart adapter 402 is considered to be the second smart adapter 112b, then any of the organizations 404 within the permissioned blockchain network 400 (and authorized to receive signed transaction requests from the at least one peer node 406 belonging to the smart adapter) may be second integration points 126. As shown, the peer node 406 that is part of the blockchain smart adapter 402 may be considered to belong to a DAPA organization 410 within the permissioned blockchain network 400, meaning it could have access to any channels that have authorized the DAPA organization 410. In other non-limiting exemplary use cases, the blockchain smart adapter 402 may function as the first smart adapter 112a.

Another advantage to a permissioned blockchain network 400 is the immutable transaction ledger 408 that is available to all the member organizations of a channel. Because the ledger 408 is immutable, it keeps all of the involved parties honest. This information may also be used by the validation module 118 as an additional data source 212 against which the unvalidated data object 210 may be compared.

The DAPA system 100 and method contemplated herein may be applied to a vast range of industries and endeavors. Of particular interest are applications within healthcare management, due to the wide range of legacy systems in use, as well as the need for greater efficiency in interactions between different parties within the industry. However, the following exploration of a particular use case should not be interpreted as limiting.

The healthcare industry is built upon a number of sub-industries that must work together to function, despite sometimes having diverging business interests. For example, providers such as hospitals, laboratories, and pharmacies seek to care for patients while maximizing earnings from those treatments, while payers such as insurers seek to care for patients while minimizing costs. Efforts to minimize disputes have resulted in the prior authorization process (sometimes referred to as pre-authorization, service review, or pre-certification). In the prior authorization process, a payer reviews a proposed expenditure, such as a surgery or a medication ordered by a provider, and decides whether payment for that expenditure would be authorized. Providers benefit from the prior authorization process because it helps them avoid providing services that will not be paid for by insurance, leaving the patient with bills that often are beyond their ability to fully pay. Payers benefit from the prior authorization process because it allows them to review proposed procedures, medications, and other services, and sometimes suggest alternatives that are less expensive for the payer and sometimes the patient.

These benefits are accompanied by a number of drawbacks. Currently, the prior authorization process requires human intervention to process and read through the patient request data. Although many payers offer on-line web portals and APIs that give the impression of an automated system, a human (e.g. a practitioner, etc.) must review each of the requests. It can take many hours, days, or even weeks to get a decision on whether or not the proposed expenditure is authorized. Additionally, conventional prior authorization systems require a person to fill out a form, which may be an electronic form submitted through a web portal, or even a paper form subsequently faxed to the payer for review. Filling out these forms is another opportunity for human error to result in erroneous responses, leading to later disputes or denial of covered services.

Another problem with conventional prior authorization processes and systems stems from the review being performed by a person. Although payers have defined policies and procedures for determining whether something should be authorized, those policies and procedures can be misinterpreted and are often applied inconsistently. Even worse, human bias, whether subconscious or deliberate, can skew the application of these policies and procedures. Factors such as race, gender, age, even how a person's name sounds can sometimes color a reviewer's application of the payers policies. All of these human errors can result in the payer later refusing to pay for a procedure that wasn't properly authorized, or prevent a patient from receiving needed care that should have been covered had the policies been properly implemented.

Furthermore, it is difficult for providers and patients to find and understand these policies and procedures established by the payer. They can be sometimes be spread across multiple websites, and easily fall out of date. This can make it difficult for providers and patients to determine whether the authorization adjudication was flawed, or even to plan what request to make of the payer in the first place.

Figure 5:
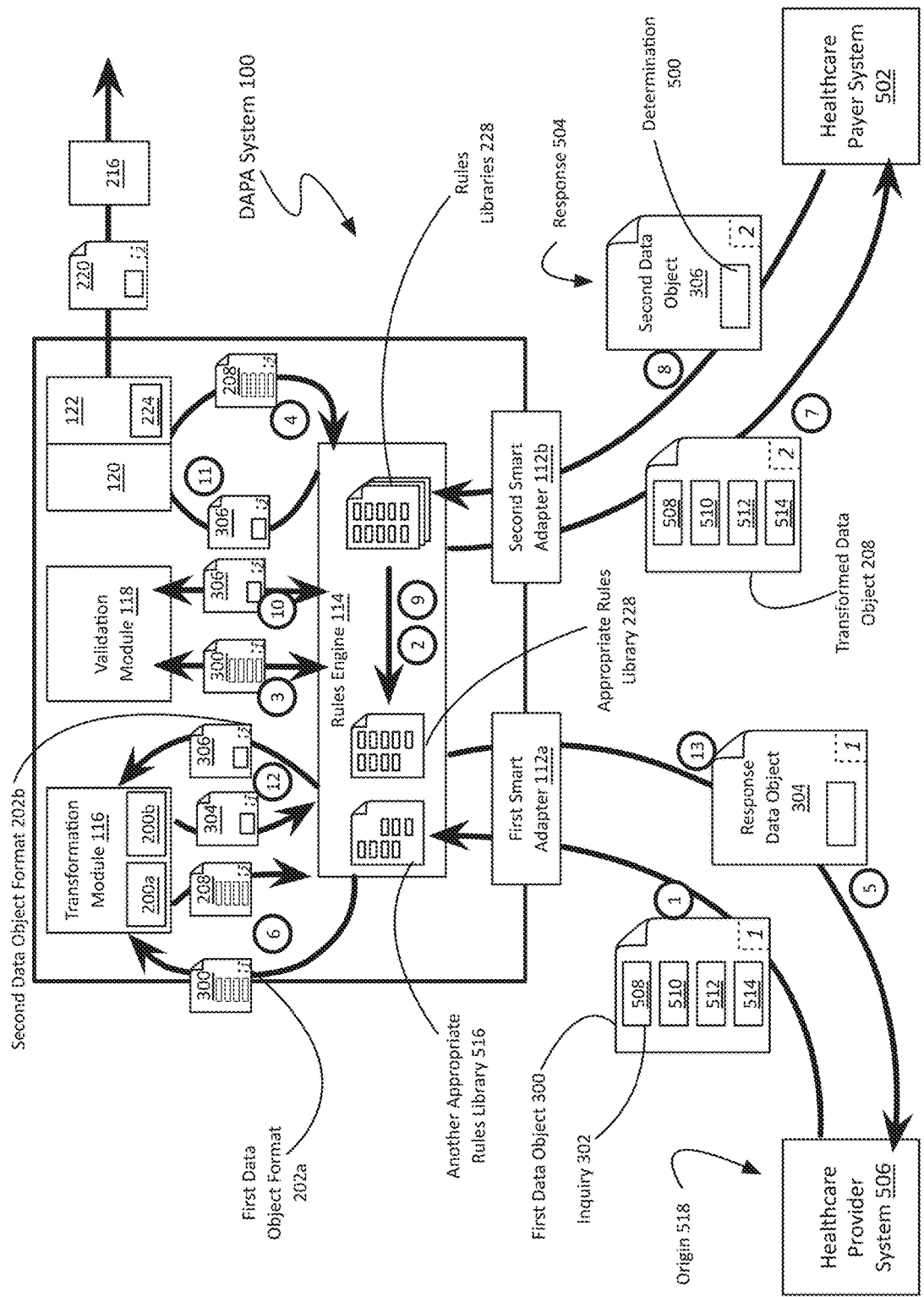
FIG. 5 is a process view of a DAPA system implemented in a healthcare use case.

FIG. 5 is a process view of a non-limiting example of a DAPA system implemented in a healthcare use case. Specifically, FIG. 5 shows the application of a DAPA system 100 toward facilitating and automating the handling of a prior authorization request.

The DAPA system 100 provides many advantages over conventional methods of providing prior authorization. Various embodiments of the system 100 can provide a decision regarding prior authorization in a matter of seconds, rather than the hours, days, or even weeks required by conventional methods. Some embodiments of the DAPA system 100 log every step of the evaluation of a request, which may be used to provide a reason for the decision that was rendered which would otherwise be difficult or impossible to get.

The DAPA system 100 is also advantageous over conventional prior authorization methods and systems because it applies the rules 230 defined by a payer (e.g. insurance provider, government benefits, etc.) consistently, and without bias. The policies surrounding what is and is not covered by a particular policy for a particular condition can be complicated, and subject to misinterpretation by the humans that conventional methods rely on. An additional advantage is that, by logging each step of the adjudication process, the DAPA system 100 facilitates oversight of the authorization process, whether by a regulator agency or by the payer itself.

Another advantage provided by the DAPA system 100 is that, by cutting out the use of web portals, paper forms, and fax machines on which conventional methods depend, there is less chance of input errors resulting in erroneous verdicts regarding authorization that can lead to subsequent conflict or ineffective patient care. Some embodiments of the DAPA system 100 can integrate with the EHR/EMR record systems in use by providers and payers, ingesting patient information directly from these systems without requiring an individual to transcribe it into a web or paper form.

The vastly improved consistency and speed of the DAPA system 100, when compared to conventional methods and systems, permits the implementation of authorization policies that are much more granular than would have been practical in the past. The rules engine 114 can select and apply a rule library 226 in near real-time, even when the rules 230 consider many more factors that would be practical to have a person consider in conventional methods. This improved granularity allows payers to implement rules 230 with built in exceptions for situations that previously would have required additional time and effort on the part of the payer to handle. Some edge cases may still require human intervention; the DAPA system 100 can automatically handle the bulk of the authorization requests, as well as recognize the edge cases and forward them on to an integration point associated with the payer for consideration.

It should be noted that while this specific use case for the DAPA system 100 is specific to prior authorization, those skilled in the art will recognize that other healthcare-related queries may also be answered with very little modification. Those other queries include, but are not limited to, the degree of patient responsibility, eligibility, and the like.

In this non-limiting example, a patient who is recovering from a recent surgery has gone to their doctor for a follow-up. The doctor believes an additional procedure is needed that can be performed as an outpatient service, and is seeking to get preauthorization from the patients insurance provider. Using a proprietary electronic health record (EHR) system, healthcare provider system 506 (i.e. first integration point 124), the doctor sends the patients information and the preauthorization request to the DAPA system 100 through a first smart adapter 112a that is compatible with that particular EHR system. See 'circle 1'.

As shown, the first data object 300 comprises a request for prior authorization 508 (i.e. inquiry 302), patient information 510, insurance policy information 512, and treatment information 514. According to various embodiments, the patient information 510 includes data that is known to be, or potentially may be, pertinent to determining prior authorization. This information may include, but is not limited to, name, age, weight, height, ailment, address, medical history, lab results, and the like. In some embodiments, the patient information 510 is provided to the rules engine 114 in a predefined format, while in other embodiments, the request for prior authorization 724 may be transformed to meet the requirements of a predefined schema, allowing the rules engine 114 to understand and operate upon input from various EMR/EHR systems having various data formats. As an option, said transformation may be performed by the rules engine 114 itself, or a smart adapter 112a, in some embodiments.

According to various embodiments, the policy information 512 may include, but is not limited to, a policy number, a policy name, primary insurance provider, secondary insurance provider, and the like. Furthermore, the treatment information 514 may include, but is not limited to, a proposed treatment, a provider, and the like. The treatment information 514 may further include at least one medical code. In some embodiments, the treatments and ailments may be codified within the rules 230 using systems such as the Healthcare Common Procedure Coding System (HCPCS), the International Classification of Diseases (ICD), and the like. In other embodiments, the rules 230 may identify the pertinent expenditure and/or ailment using more than one method, including but not limited to a code, a common name, a brand name, a generic name, a chemical formula, and the like.

According to various embodiments, the first thing the rules engine 114 does upon receipt of the first data object 300 (or, in some embodiments, receipt of a pointer to the location of the first data object 300 within the volatile memory 104 of the DAPA system 100) is identify an appropriate rules library 228. See 'circle 2'. As previously discussed, in some embodiments, the appropriate rules library 228 is identified from among a plurality of rules libraries 226 using, at least in part, the first data object 300. According to various embodiments, the appropriate rules library 228 comprises at least one rule 238, as well as an indication of which smart adapter 112 is the second smart adapter 112b (i.e. the intended destination of the first data object 300 after the application of the appropriate rules library 228).

In some embodiments, the rules engine 114 may instruct the validation module 118 to validate the first data object 300. See 'circle 3'. According to various embodiments, the validation may comprise comparing the first data object 300 with another data source including, but not limited to, a data store external to the DAPA system 100, the ledger of a blockchain network, the internal storage 108 of the DAPA system 100, an external server, and the like. In some embodiments, the validation may also include determining if the first data object 300 is internally consistent, as previously discussed. In some embodiments, the validation may be performed after the first data object 300 has been transformed into a different format, instead of being applied to the first data object 300.

In some cases, the defined rules 230 may indicate that the first data object 300 is incomplete for the intended purposes, and that additional information is needed. For example, the rules 230 defined by the insurance company may indicate that specific details about the hospital procedure are needed for authorizing an outpatient follow-up procedure. The rules engine 114 may request the electronic medical record (EMR) associated with this patients operation directly from the hospital EMR system, using a different smart adapter 112 configured specifically for that hospital and that EMR system.

According to various embodiments, after validation, the first data object 300 (or a transformed data object 208, as discussed above) may be exposed to the aggregation module 120. See 'circle 4'. The rules engine 114 instructs the aggregation module 120 to observe the first data object 300 and perform a statistical analysis 218 to generate statistical data 216, according to various embodiments. In some embodiments, the rules engine 114 may instruct the aggregation module 120 to observe a transformed data object 208 (i.e. the first data object 300 after it has been transformed to be compatible with the second integration point 126).

In some embodiments, the aggregation module 120 may also create a copy 220 of the first data object 300 or the transformed data object 208 (as shown in FIG. 3). These duplicated data objects 220 may be used to develop and/or refine a model, such as a machine learning model 222, as discussed above. This modeling may be performed by the aggregation module 120 in some embodiments, while in other embodiments the copies 220 may be sent to a system or group outside of the DAPA system 100 for modeling.

Data in hand, a number of scenarios may play out. If the details surrounding the prior authorization request fall within an anticipated pattern, the insurance company may have defined rules 230 to make the authorization determination within the rules engine 114, without needing to consult the healthcare payer system 502. In such a case, the authorization determination can be returned in a matter of seconds rather than hours or days.

In some embodiments, the rules engine 114 may attempt to generate a response data object 304 that responds to the inquiry 302, in this case a request for prior authorization 508. If successfully generated, the response data object 304 is subsequently sent back to the healthcare provider system 506 (i.e. the first integration point 124) through the first smart adapter 112a. See 'circle 5'.

In the cases where the rules engine's 114 attempt to generate a response data object 304 on behalf of the insurance company fail, or are not possible with the appropriate rules library 228 (e.g. the appropriate rules library 228 does not have the rule(s) 230 that address the inquiry 302, etc.), the rules engine 114 may continue to apply the remaining rules 230 of the appropriate rules library 228.

If the inquiry 302 is beyond the ability of the rules engine 114 to automatically handle, the first data object 300 comprising the preauthorization request 508 is passed on to the insurance company, specifically to the healthcare payer system 502 (i.e. the second integration point 126). The data is passed through the transformation module 116 to create a data object that is compatible with the blockchain network. This object is sent to the insurance company.

Thus, at some point, the rules engine 114 will need to instruct the transformation module 116 to transform the first data object 300 into the transformed data object 208, having the proper format. See 'circle 6'. As previously discussed, the transformation module 116 utilizes the data formats defined in the first schema 200a provided by the first smart adapter 112a and the second schema 200b provided by the second smart adapter 112b, according to various embodiments.

Once the transformed data object 208 has been created by placing the first data object 300 into the second data object format 202b, it may be sent to the healthcare payer system 502 (i.e. second integration point 126). See 'circle 7'. According to various embodiments, the transformed data object 208 is sent to the second integration point 126 through the second smart adapter 112b. It should be noted that, throughout this non-limiting example, it is assumed that the first data object format 202a is different than the second data object format 202b, thus requiring the transformation.

Upon receipt of the transformed data object 208 from the second smart adapter 112b, the healthcare payer system 502 proceed to generate a reply to the inquiry 302. According to various embodiments, the healthcare payer system 502 may prepare and send a second data object 306 comprising a determination 500 of prior authorization, which may indicate that authorization is granted, denied, wasn't necessary, or that a decision could not be made because additional information is needed. The second data object 306 is in the second data object format 202b, and is sent to the second smart adapter 112b, according to various embodiments. See 'circle 8'.

Upon arrival at the rules engine 114, the rules engine 114 may first determine the exact nature of the second data object 306. In other words, in some embodiments, the rules engine 114 first identifies the second data object 306 as a response 504 to the inquiry 302 (i.e. request for prior authorization 508) in the data object received from the healthcare provider system 506 (i.e. first integration point 124). Next, the rules engine 114 identifies another appropriate rules library 516 from the plurality of rules libraries 226. See 'circle 9'. According to various embodiments, the rules engine 114 identifies this additional appropriate rules library 516 use at least one of the second data object 306, the origin 518 of the first data object 300 (i.e. the healthcare provider system 506), and the response data object 304, which is the second data object 306 after being transformed into the first data object format 212a (i.e. the data object format for the doctors records system). It should be noted that in some embodiments, the same rules library 226 may be employed for communication in both directions, while in other embodiments, each interaction is treated as a separate event, with previous events only serving as clues leading to the most appropriate rules library for that situation.

Similar to the first transition from the healthcare provider system 506 to the healthcare payer system 502, in some embodiments the rules engine 114 may next instruction the validation module 118 to validate the second data object 306 (see 'circle 10') before passing it on to the aggregation and cleansing modules. See 'circle 11'. As the predicate data (e.g. patient information 510, insurance policy information 512, treatment information 514, etc.) and prior authorization determination 500 pass through the DAPA system 100, the aggregation module 120 passes statistic 216 regarding the interaction on to a billing entity. At the same time, a copy 220 of the various data objects may be passed through the cleansing module 122. The resulting HIPAA-compliant data is then passed to a data science team, providing data for modeling preauthorization for that particular insurance company. If the model 222 has reached a threshold level of accuracy, it may be used to augment the insurance companies set of rules in the rules engine 114.

Next, the rules engine 114 instructs the transformation module 116 to transform the second data object 306 into a format compatible with the doctor's record system. More specifically, the transformation module 116 transforms the second data object 306 into a response data object 228 having the first data object format 202a as specified by the schema 200a of the first smart adapter 112a, which is associated with the healthcare provider system 506. See 'circle 12'. Finally, the response data object 304, comprising the prior authorization determination 500 rendered by the insurance company (or, in some cases, the rules engine 114), is sent to the healthcare provider system 506, via the first smart adapter 112a. See 'circle 13'.

In some embodiments, the end result of the healthcare revenue cycle (e.g. payer covered the expense, payer denied expense, etc.) can be used to improve a rule library 226. As previously discussed, in some embodiments, this data combined with patient data and rule data may be used to create a model 222 to automatically suggest new 234 or modified rules 232 that are more effective for all parties involved. As an option, the result data may also include the degree to which the procedure, medication, etc. was successful, allowing a model 222 to balance cost with efficacy. Such a model 222 may also assist a payer in defining rules that would prefer one treatment or medication over another, and would be based on results of the rules 230 and medicine as applied, rather than in theory. As an option, the data may be programmatically scrubbed of sensitive data by the cleansing module 122 before modeling, to stay in compliance with regulations concerning the privacy of healthcare records and personally identifying information.

Figure 6:
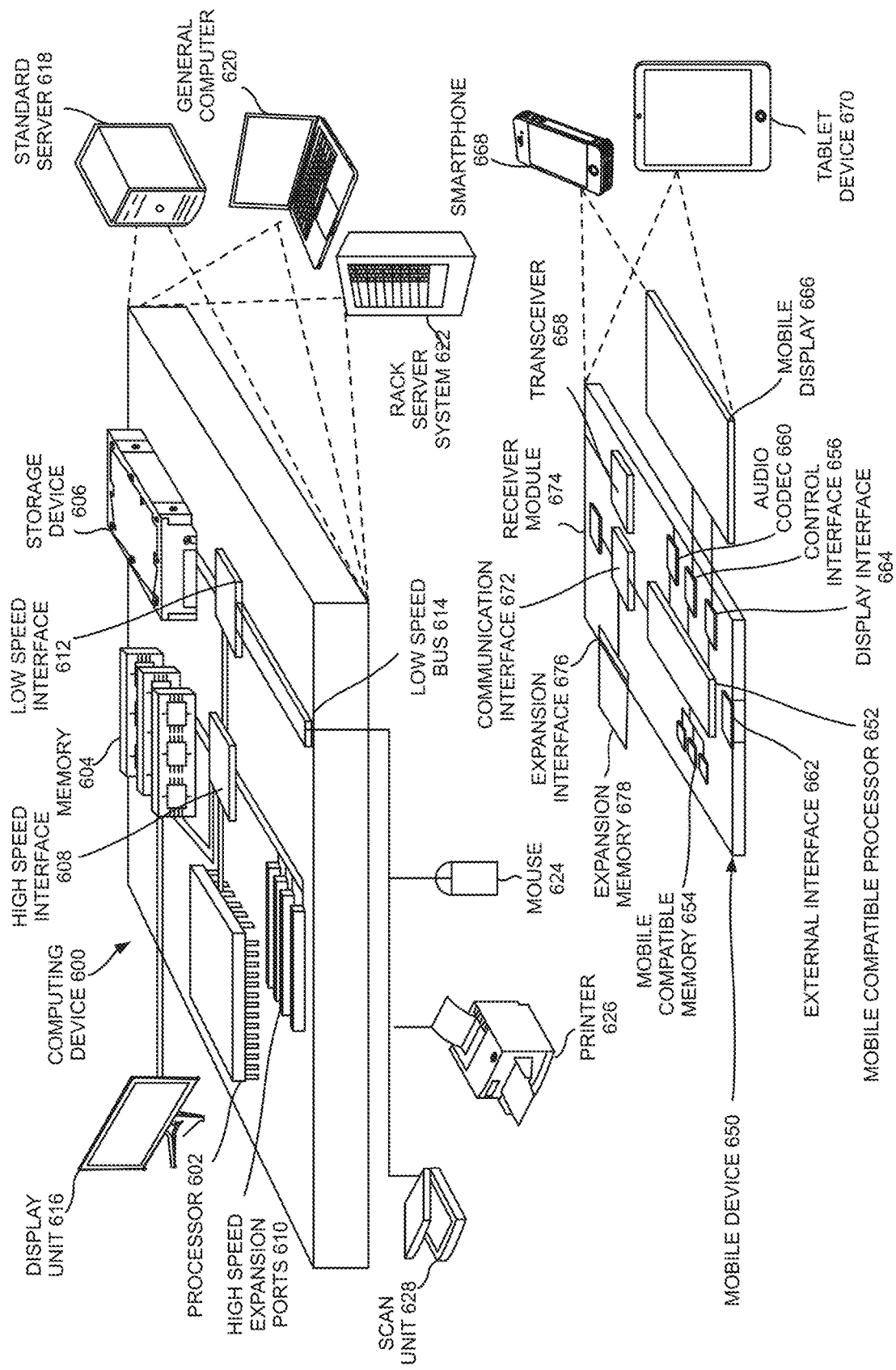
FIG. 6 is a schematic diagram of a specific computing device that can be used to implement the methods and systems disclosed herein.

FIG. 6 is a schematic diagram of specific computing device 600 and a specific mobile computing device 650 that can be used to perform and/or implement any of the embodiments disclosed herein. In one or more embodiments, the first integration point 124, second integration point 126, and/or DAPA system 100 may be the specific computing device 600.

The specific computing device 600 may represent various forms of digital computers, such as laptops, desktops, workstations, personal digital assistants, servers, blade servers, mainframes, and/or other appropriate computers. The specific mobile computing device 650 may represent various forms of mobile devices, such as smartphones, camera phones, personal digital assistants, cellular telephones, and other similar mobile devices. The components shown here, their connections, couples, and relationships, and their functions, are meant to be exemplary only, and are not meant to limit the embodiments described and/or claimed, according to one embodiment.

The specific computing device 600 may include a processor 602, a memory 604, a storage device 606, a high speed interface 608 coupled to the memory 604 and a plurality of high speed expansion ports 610, and a low speed interface 612 coupled to a low speed bus 614 and a storage device 606. In one embodiment, each of the components heretofore may be inter-coupled using various buses, and may be mounted on a common motherboard and/or in other manners as appropriate. The processor 602 may process instructions for execution in the specific computing device 600, including instructions stored in the memory 604 and/or on the storage device 606 to display a graphical information for a GUI on an external input/output device, such as a display unit 616 coupled to the high speed interface 608, according to one embodiment.

In other embodiments, multiple processors and/or multiple buses may be used, as appropriate, along with multiple memories and/or types of memory. Also, a plurality of specific computing device 600 may be coupled with, with each device providing portions of the necessary operations (e.g., as a server bank, a group of blade servers, and/or a multi-processor system).

The memory 604 may be coupled to the specific computing device 600. In one embodiment, the memory 604 may be a volatile memory. In another embodiment, the memory 604 may be a non-volatile memory. The memory 604 may also be another form of computer-readable medium, such as a magnetic and/or an optical disk. The storage device 606 may be capable of providing mass storage for the specific computing device 600. In one embodiment, the storage device 606 may include a floppy disk device, a hard disk device, an optical disk device, a tape device, a flash memory and/or other similar solid state memory device. In another embodiment, the storage device 606 may be an array of the devices in a computer-readable medium previously mentioned heretofore, computer-readable medium, such as, and/or an array of devices, including devices in a storage area network and/or other configurations.

A computer program may be comprised of instructions that, when executed, perform one or more methods, such as those described above. The instructions may be stored in the memory 604, the storage device 606, a memory coupled to the processor 602, and/or a propagated signal.

The high speed interface 608 may manage bandwidth-intensive operations for the specific computing device 600, while the low speed interface 612 may manage lower bandwidth-intensive operations. Such allocation of functions is exemplary only. In one embodiment, the high speed interface 608 may be coupled to the memory 604, the display unit 616 (e.g., through a graphics processor and/or an accelerator), and to the plurality of high speed expansion ports 610, which may accept various expansion cards.

In the embodiment, the low speed interface 612 may be coupled to the storage device 606 and the low speed bus 614. The low speed bus 614 may be comprised of a wired and/or wireless communication port (e.g., a Universal Serial Bus ("USB"), a Bluetooth® port, an Ethernet port, and/or a wireless Ethernet port). The low speed bus 614 may also be coupled to the scan unit 628, a printer 626, a keyboard, a mouse 624, and a networking device (e.g., a switch and/or a router) through a network adapter.

The specific computing device 600 may be implemented in a number of different forms, as shown in the figure. In one embodiment, the specific computing device 600 may be implemented as a standard server 618 and/or a group of such servers. In another embodiment, the specific computing device 600 may be implemented as part of a rack server system 622. In yet another embodiment, the specific computing device 600 may be implemented as a general computer 620 such as a laptop or desktop computer. Alternatively, a component from the specific computing device 600 may be combined with another component in a specific mobile computing device 650. In one or more embodiments, an entire system may be made up of a plurality of specific computing device 600 and/or a plurality of specific computing device 600 coupled to a plurality of specific mobile computing device 650.

In one embodiment, the specific mobile computing device 650 may include a mobile compatible processor 652, a mobile compatible memory 654, and an input/output device such as a mobile display 666, a communication interface 672, and a transceiver 658, among other components. The specific mobile computing device 650 may also be provided with a storage device, such as a microdrive or other device, to provide additional storage. In one embodiment, the components indicated heretofore are inter-coupled using various buses, and several of the components may be mounted on a common motherboard.

The mobile compatible processor 652 may execute instructions in the specific mobile computing device 650, including instructions stored in the mobile compatible memory 654. The mobile compatible processor 652 may be implemented as a chipset of chips that include separate and multiple analog and digital processors. The mobile compatible processor 652 may provide, for example, for coordination of the other components of the specific mobile computing device 650, such as control of user interfaces, applications run by the specific mobile computing device 650, and wireless communication by the specific mobile computing device 650.

The mobile compatible processor 652 may communicate with a user through the control interface 656 and the display interface 664 coupled to a mobile display 666. In one embodiment, the mobile display 666 may be a Thin-Film-Transistor Liquid Crystal Display ("TFT LCD"), an Organic Light Emitting Diode ("OLED") display, and another appropriate display technology. The display interface 664 may comprise appropriate circuitry for driving the mobile display 666 to present graphical and other information to a user. The control interface 656 may receive commands from a user and convert them for submission to the mobile compatible processor 652.

In addition, an external interface 662 may be in communication with the mobile compatible processor 652, so as to enable near area communication of the specific mobile computing device 650 with other devices. External interface 662 may provide, for example, for wired communication in some embodiments, or for wireless communication in other embodiments, and multiple interfaces may also be used.

The mobile compatible memory 654 may be coupled to the specific mobile computing device 650. The mobile compatible memory 654 may be implemented as a volatile memory and a non-volatile memory. The expansion memory 678 may also be coupled to the specific mobile computing device 650 through the expansion interface 676, which may comprise, for example, a Single In Line Memory Module ("SIMM") card interface. The expansion memory 678 may provide extra storage space for the specific mobile computing device 650, or may also store an application or other information for the specific mobile computing device 650.

Specifically, the expansion memory 678 may comprise instructions to carry out the processes described above. The expansion memory 678 may also comprise secure information. For example, the expansion memory 678 may be provided as a security module for the specific mobile computing device 650, and may be programmed with instructions that permit secure use of the specific mobile computing device 650. In addition, a secure application may be provided on the SIMM card, along with additional information, such as placing identifying information on the SIMM card in a non-hackable manner.

The mobile compatible memory may include a volatile memory (e.g., a flash memory) and a non-volatile memory (e.g., a non-volatile random-access memory ("NVRAM")). In one embodiment, a computer program comprises a set of instructions that, when executed, perform one or more methods. The set of instructions may be stored on the mobile compatible memory 654, the expansion memory 678, a memory coupled to the mobile compatible processor 652, and a propagated signal that may be received, for example, over the transceiver 658 and/or the external interface 662.

The specific mobile computing device 650 may communicate wirelessly through the communication interface 672, which may be comprised of a digital signal processing circuitry. The communication interface 672 may provide for communications using various modes and/or protocols, such as, a Global System for Mobile Communications ("GSM") protocol, a Short Message Service ("SMS") protocol, an Enhanced Messaging System ("EMS") protocol, a Multimedia Messaging Service ("MMS") protocol, a Code Division Multiple Access ("CDMA") protocol, Time Division Multiple Access ("TDMA") protocol, a Personal Digital Cellular ("PDC") protocol, a Wideband Code Division Multiple Access ("WCDMA") protocol, a CDMA2000 protocol, and a General Packet Radio Service ("GPRS") protocol.

Such communication may occur, for example, through the transceiver 658 (e.g., radio-frequency transceiver). In addition, short-range communication may occur, such as using a Bluetooth®, Wi-Fi, and/or other such transceiver. In addition, a GPS ("Global Positioning System") receiver module 674 may provide additional navigation-related and location-related wireless data to the specific mobile computing device 650, which may be used as appropriate by a software application running on the specific mobile computing device 650.

The specific mobile computing device 650 may also communicate audibly using an audio codec 660, which may receive spoken information from a user and convert it to usable digital information. The audio codec 660 may likewise generate audible sound for a user, such as through a speaker (e.g., in a handset smartphone of the specific mobile computing device 650). Such a sound may comprise a sound from a voice telephone call, a recorded sound (e.g., a voice message, a music files, etc.) and may also include a sound generated by an application operating on the specific mobile computing device 650.

The specific mobile computing device 650 may be implemented in a number of different forms, as shown in the figure. In one embodiment, the specific mobile computing device 650 may be implemented as a smartphone 668. In another embodiment, the specific mobile computing device 650 may be implemented as a personal digital assistant ("PDA"). In yet another embodiment, the specific mobile computing device, 650 may be implemented as a tablet device 670.

Various embodiments of the systems and techniques described here can be realized in a digital electronic circuitry, an integrated circuitry, a specially designed application specific integrated circuits ("ASICs"), a piece of computer hardware, a firmware, a software application, and a combination thereof. These various embodiments can include embodiment in one or more computer programs that are executable and/or interpretable on a programmable system including one programmable processor, which may be special or general purpose, coupled to receive data and instructions from, and to transmit data and instructions to, a storage system, one input device, and at least one output device.

These computer programs (also known as programs, software, software applications, and/or code) comprise machine-readable instructions for a programmable processor, and can be implemented in a high-level procedural and/or object-oriented programming language, and/or in assembly/machine language. As used herein, the terms "machine-readable medium" and/or "computer-readable medium" refers to any computer program product, apparatus and/or device (e.g., magnetic discs, optical disks, memory, and/or Programmable Logic Devices ("PLDs")) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computing device having a display device (e.g., a cathode ray tube ("CRT") and/or liquid crystal ("LCD") monitor) for displaying information to the user and a keyboard and a mouse by which the user can provide input to the computer. Other kinds of devices can be used to provide for interaction with a user as well; for example, feedback provided to the user can be any form of sensory feedback (e.g., visual feedback, auditory feedback, and/or tactile feedback) and input from the user can be received in any form, including acoustic, speech, and/or tactile input.

The systems and techniques described here may be implemented in a computing system that includes a back end component (e.g., as a data server), a middleware component (e.g., an application server), a front end component (e.g., a client computer having a graphical user interface, and/or a Web browser through which a user can interact with an embodiment of the systems and techniques described here), and a combination thereof. The components of the system may also be coupled through a communication network.

The communication network may include a local area network ("LAN") and a wide area network ("WAN") (e.g., the Internet). The computing system can include a client and a server. In one embodiment, the client and the server are remote from each other and interact through the communication network.

A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It may be appreciated that the various systems, methods, and apparatus disclosed herein may be embodied in a machine-readable medium and/or a machine accessible medium compatible with a data processing system (e.g., a computer system), and/or may be performed in any order.

The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

Where the above examples, embodiments and implementations reference examples, it should be understood by those of ordinary skill in the art that other modules, data objects, and networks could be intermixed or substituted with those provided. In places where the description above refers to particular embodiments of a system and method for data aggregation and process automation, it should be readily apparent that a number of modifications may be made without departing from the spirit thereof and that these embodiments and implementations may be applied to other to data aggregation and communication facilitation systems and methods, as well. Accordingly, the disclosed subject matter is intended to embrace all such alterations, modifications and variations that fall within the spirit and scope of the disclosure and the knowledge of one of ordinary skill in the art.

What is claimed is:

1. A method for data aggregation and process automation, comprising:

receiving a first data object from a first integration point, which is a healthcare provider system, through a first smart adapter configured to send and receive data objects to and from the first integration point, the first smart adapter comprising a first schema describing a first data object format utilized by the first integration point and a first protocol for communicating with the first integration point, wherein the first data object comprises a request for prior authorization;

identifying an appropriate rules library from a plurality of rules libraries using a rules engine, the appropriate rules library being a rules library that matches at least some characteristics of an interaction of receiving the first data object, the characteristics comprising a data object origin of the first data object, a data object format of the first data object, a request or inquiry within the first data object, and a data object destination of the first data object, the appropriate rules library being identified using the first data object, wherein each rule library comprises at least one rule, and wherein the appropriate rules library indicates a second smart adapter configured to send and receive data objects to and from a second integration point, the second smart adapter comprising a second schema describing a second data object format utilized by the second integration point and a second protocol for communicating with the second integration point;

applying the appropriate rules library through the rules engine by:

instructing a transformation module with the rules engine to transform the first data object having the first data object format into a transformed data object having the second data object format, the transformation module performing the transformation using the first schema and the second schema;

instructing a validation module with the rules engine to validate at least one of the first data object and the transformed data object by at least one of:

comparing the at least one of the first data object and the transformed data object with a different source of data, and determining if the at least one of the first data object and the transformed data object is internally consistent; and instructing an aggregation module with the rules engine to perform a statistical analysis on one of the first data object and the transformed data object to generate statistical data, and to create a copy of the first data object;

attempting to generate, with the rules engine, a response data object on behalf of the second integration point by applying at least one rule of the appropriate rules library defined to address the request for prior authorization using the first data object, the response data object being in the first data object format and comprising a determination of prior authorization from the rules engine;

sending the transformed data object to the second integration point associated with the second smart adapter, if the rules engine was unable to generate the response data object;

receiving a second data object comprising a determination of prior authorization from the second integration point, wherein the second integration point is a healthcare payer system;

identifying the second data object as a response to the first data object received from the first integration point;

identifying another appropriate rules library from the plurality of rules libraries using the rules engine, the another appropriate rules library being a rules library that matches at least some characteristics of at least one of an interaction of receiving the first data object, an interaction of receiving the second data object and an interaction of generating the response data object, the characteristics comprising a data object origin, a data object format, a request or inquiry within a data object, and a data object destination, the another appropriate rules library being identified using at least one of the second data object, an origin of the first data object, and the response data object;

applying the another appropriate rules library through the rules engine by:

instructing the transformation module with the rules engine to transform the second data object having the second data object format into the response data object having the first data object format, the transformation module performing the transformation using the second schema and the first schema;

instructing the validation module with the rules engine to validate at least one of the second data object and the response data object by at least one of:

comparing the at least one of the second data object and the response data object with the different source of data, and determining if the at least one of the second data object and the response data object is internally consistent; and instructing the aggregation module with the rules engine to:

perform the statistical analysis on one of the second data object and the response data object to generate statistical data, and create a machine learning model using at least the copy of the first data object and the response data object;

instructing a cleansing module to sanitize the copy of the first data object, placing the copy of the first data object in compliance with a data privacy policy before creating the machine learning model; and creating at least one of a modified rule and a new rule within the appropriate rules library, using the machine learning model and the rules engine; and sending the response data object to the first integration point.

2. The method of claim 1, wherein one of the first smart adapter and the second smart adapter comprises a blockchain smart adapter configured to communicate with an organization within a permissioned blockchain network through a peer node.

3. The method of claim 2, wherein the rules engine instructs the transformation module and validation module through a permissioned blockchain network, and wherein the at least one rule of each rules library of the plurality of rules libraries is evaluated at runtime rather than precompiled.

4. The method of claim 2, wherein the different source of data used by the validation module for comparison is an immutable transaction ledger of the permissioned blockchain network.

5. A method for data aggregation and process automation, comprising:
receiving a first data object from a first integration point through a first smart adapter configured to send and receive data objects to and from the first integration point, the first smart adapter comprising a first schema describing a first data object format utilized by the first integration point and a first protocol for communicating with the first integration point;
identifying an appropriate rules library from a plurality of rules libraries using a rules engine, the appropriate rules library being identified using the first data object, wherein each rule library comprises at least one rule, and wherein the appropriate rules library indicates a second smart adapter configured to send and receive data objects to and from a second integration point, the second smart adapter comprising a second schema describing a second data object format utilized by the second integration point and a second protocol for communicating with the second integration point;
applying the appropriate rules library through the rules engine by:
instructing a transformation module with the rules engine to transform the first data object having the first data object format into a transformed data object having the second data object format, the transformation module performing the transformation using the first schema and the second schema;
instructing a validation module with the rules engine to validate at least one of the first data object and the transformed data object by at least one of:
comparing the at least one of the first data object and the transformed data object with a different source of data, and
determining if the at least one of the first data object and the transformed data object is internally consistent; and
instructing an aggregation module with the rules engine to perform a statistical analysis on one of the first data object and the transformed data object to generate statistical data; and
sending the transformed data object to the second integration point associated with the second smart adapter.

6. The method of claim 5, further comprising:
receiving a second data object comprising a determination of prior authorization from the second integration point, wherein the second integration point is a healthcare payer system;
identifying the second data object as a response to the first data object received from the first integration point, wherein the first integration point is a healthcare provider system, and wherein the first data object comprises a request for prior authorization, patient information, insurance policy information, and treatment information;
identifying another appropriate rules library from the plurality of rules libraries using the rules engine, the another appropriate rules library being identified using at least one of the second data object and an origin of the first data object;
applying the another appropriate rules library through the rules engine by:
instructing the transformation module with the rules engine to transform the second data object having the second data object format into a response data object having the first data object format, the transformation module performing the transformation using the second schema and the first schema;
instructing the validation module with the rules engine to validate at least one of the second data object and the response data object by at least one of:
comparing the at least one of the second data object and the response data object with the different source of data, and
determining if the at least one of the second data object and the response data object is internally consistent; and
instructing the aggregation module with the rules engine to perform the statistical analysis on one of the second data object and the response data object to generate statistical data; and
sending the response data object to the first integration point.

7. The method of claim 5, wherein the rules engine communicates with the transformation module and validation module through one of a permissioned blockchain network and a network interface communicatively coupling the rules engine and the transformation module through a network, and wherein the at least one rule of each rules library of the plurality of rules libraries is evaluated at runtime rather than precompiled.

8. The method of claim 5:
wherein the first data object comprises an inquiry to be answered by the second integration point; and
wherein applying the appropriate rules library through the rules engine further comprises:
attempting to generate a response data object on behalf of the second integration point by applying at least one rule of the appropriate rules library defined to address the inquiry, the response data object being in the first data object format;
sending the response data object to the first integration point via the first smart adapter upon successful generation of the response data object; and
continuing to apply the appropriate rules library.

9. The method of claim 5, wherein one of the first smart adapter and the second smart adapter comprises a blockchain smart adapter configured to communicate with an organization within a permissioned blockchain network through a peer node.

10. The method of claim 9, wherein the different source of data used by the validation module for comparison is an immutable transaction ledger of the permissioned blockchain network.

11. The method of claim 5, wherein instructing the aggregation module with the rules engine further comprises:
creating a copy of the first data object using the aggregation module; and
creating a machine learning model using the copy of the first data object.

12. The method of claim 11, wherein applying the appropriate rules library further comprises:
instructing a cleansing module to sanitize the copy of the first data object, placing the copy of the first data object in compliance with a data privacy policy before creating the machine learning model; and creating at least one of a modified rule and a new rule within the appropriate rules library, using the machine learning model and the rules engine.

13. A data aggregation and process automation system, comprising:
 a processor communicatively coupled to a memory and a network interface, the network interface communicatively coupled to a network;
 a storage communicatively coupled to the processor, the storage comprising:
  a first smart adapter associated with a first integration point and configured to send and receive data objects to and from the first integration point using the network interface, and a second smart adapter associated with a second integration point and configured to send and receive data objects to and from the second integration point using the network interface, the first smart adapter comprising a first schema describing a first data object format utilized by the first integration point and a first protocol for communicating with the first integration point, the second smart adapter comprising a second schema describing a second data object format utilized by the second integration point and a second protocol for communicating with the second integration point;
  a transformation module configured to transform an incoming data object organized in the first data object format into a transformed data object having the second data object format, the transformation module performing the transformation using the first schema and the second schema;
  an aggregation module configured to gather statistical data from an observed data object by performing a statistical analysis on the observed data object;
  a validation module configured to validate an unvalidated data object by at least one of:
   comparing the unvalidated data object with a different source of data, and
   determining if the unvalidated data object is internally consistent; and
  a rules engine configured to:
   identify an appropriate rules library from a plurality of rules libraries using a first data object received through the first smart adapter from the first integration point, each rule library having at least one rule, wherein the appropriate rules library indicates the second smart adapter; and
   apply the appropriate rules library through at least one of:
    instructing the transformation module to transform the first data object having the first data object format into the transformed data object,
    instructing the validation module to validate the first data object,
    instructing the aggregation module to gather statistical data from one of the first data object and the transformed data object, and
    sending the transformed data object to the second integration point associated with the second smart adapter.

14. The system of claim 13, wherein the rules engine communicates with the transformation module and validation module through one of a permissioned blockchain network and the network interface.

15. The system of claim 13:
 wherein the first data object comprises an inquiry to be answered by the second integration point; and
 wherein the rules engine is further configured to:
  attempt to generate a response data object on behalf of the second integration point by applying at least one rule of the appropriate rules library defined to address the inquiry, the response data object being in the first data object format;
  send the response data object to the first integration point via the first smart adapter upon successful generation of the response data object; and
  continue to apply the appropriate rules library if the generation of the response data object is unsuccessful.

16. The system of claim 13, wherein one of the first smart adapter and the second smart adapter comprises a blockchain smart adapter configured to communicate with an organization within a permissioned blockchain network through a peer node.

17. The system of claim 16, wherein the validation module is further configured to validate the unvalidated data object by comparing the unvalidated data object to an immutable transaction ledger of the permissioned blockchain network.

18. The system of claim 13, wherein the aggregation module is further configured to:
 create a copy of the observed data object; and
 create a machine learning model using the copy of the observed data object.

19. The system of claim 18, further comprising a cleansing module configured to sanitize the copy of the observed data object to place the copy of the observed data object in compliance with a data privacy policy before creating the machine learning model.

20. The system of claim 18, wherein the rules engine is further configured to use the machine learning model to create at least one of a modified rule and a new rule within the appropriate rules library.

* * * * *